US011812213B2

(12) United States Patent
Bhowmik et al.

(10) Patent No.: US 11,812,213 B2
(45) Date of Patent: Nov. 7, 2023

(54) EAR-WEARABLE DEVICES FOR CONTROL OF OTHER DEVICES AND RELATED METHODS

(71) Applicant: Starkey Laboratories, Inc., Eden Prairie, MN (US)

(72) Inventors: Achintya Kumar Bhowmik, Cupertino, CA (US); Gregory John Haubrich, Champlin, MN (US); Paul Shriner, Hopkins, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 42 days.

(21) Appl. No.: 17/489,041

(22) Filed: Sep. 29, 2021

(65) Prior Publication Data

US 2022/0103927 A1 Mar. 31, 2022

Related U.S. Application Data

(60) Provisional application No. 63/085,281, filed on Sep. 30, 2020.

(51) Int. Cl.
*H04R 1/10* (2006.01)
*G06F 1/16* (2006.01)
(Continued)

(52) U.S. Cl.
CPC ........... *H04R 1/1041* (2013.01); *G06F 1/163* (2013.01); *G06F 3/011* (2013.01); *G10L 15/22* (2013.01);
(Continued)

(58) Field of Classification Search
CPC ..... H04W 4/24; H04W 48/18; H04W 64/006; H04W 76/19; H04W 8/005; H04W 72/00;
(Continued)

(56) References Cited

U.S. PATENT DOCUMENTS 5,461,371 A 10/1995 Matsumoto et al.
6,230,130 B1 5/2001 Castello et al.
(Continued)

FOREIGN PATENT DOCUMENTS

DE 10030915 1/2002
EP 2725818 4/2014
(Continued)

OTHER PUBLICATIONS

"Eye Tracking & Access Technologies," PRC-Saltillo Product Overview page accessible at least as early as Dec. 9, 2019 at URL <https://www.prentrom.com/prc_advantage/eye-tracking-and-access-technologies> (11 pages).
(Continued)

*Primary Examiner* — Lun-See Lao
(74) *Attorney, Agent, or Firm* — Pauly, DeVries Smith & Deffner LLC

(57) ABSTRACT

Embodiments herein relate to ear-wearable devices that can be used to control other device and related methods. In a first aspect, an ear-wearable device is included having a control circuit, a wireless communications circuit, a microphone, and a motion sensor. The ear-wearable device is configured to receive an input from a wearer of the ear-wearable device, select a controllable device to be controlled based on factors including at least one of physical proximity between the ear-wearable device and the controllable device and a direction that the head of the wearer is pointing, and issue a control command to the controllable device. Other embodiments are also included herein.

20 Claims, 12 Drawing Sheets

(51) Int. Cl.
*G06F 3/01* (2006.01)
*G10L 15/22* (2006.01)

(52) U.S. Cl.
CPC .... *G10L 2015/223* (2013.01); *H04R 2420/07* (2013.01)

(58) Field of Classification Search
CPC ..... H04W 84/10; H04W 84/18; H04W 88/08; H04M 1/05; H04M 1/6066; H04M 15/8033; H04M 15/80; H04M 2250/12; H04M 1/6008; H04M 1/6016; H04R 2201/107; H04R 1/1025; H04R 2420/07; H04R 5/0335; H04R 1/083; H04R 1/1008; H04R 1/1033; H04R 2420/09; H04R 1/1016; H04R 1/1083; H04R 1/345; H04R 1/02; H04R 1/1041; H04R 1/105; H04R 1/1058; H04R 1/1066; H04R 1/1091; H04R 1/14; H04R 1/44; H04R 2201/028; H04N 5/247; H04N 13/128; H04N 13/243; H04N 13/271; H04N 5/2226; H04N 5/2256; H04N 5/2258; H04N 5/232; H04N 5/332; H04N 13/302; H04N 13/356; H04N 13/363; H04N 13/156; H04N 21/44218; H04N 21/858; H04N 5/04; H04N 5/225251; H04N 5/77; H04N 9/04515; H04N 9/09; H04Q 3/62; H04Q 3/66; G10K 11/17855; G10K 11/17857; G10K 11/17873; G10K 11/17885; G10K 2210/108; G10K 2210/1081
USPC ...................................... 381/74, 312; 700/94
See application file for complete search history.

(56) References Cited

U.S. PATENT DOCUMENTS

| | | | |
|---|---|---|---|
| 6,498,955 B1 | 12/2002 | McCarthy et al. | |
| 8,780,201 B1 | 7/2014 | Scalisi et al. | |
| 8,923,543 B2 | 12/2014 | Sacha et al. | |
| 9,055,202 B1 | 6/2015 | Scalisi et al. | |
| 9,100,694 B1 | 8/2015 | Chandel et al. | |
| 9,136,881 B2 | 9/2015 | Groeschel et al. | |
| 9,167,356 B2 | 10/2015 | Higgins et al. | |
| 9,179,107 B1 | 11/2015 | Scalisi et al. | |
| 9,179,109 B1 | 11/2015 | Kasmir et al. | |
| 9,210,518 B2 | 12/2015 | Zhang | |
| 9,219,964 B2 | 12/2015 | Merks | |
| 9,742,890 B2 | 8/2017 | Gibbons | |
| 9,794,701 B2 | 10/2017 | Flood et al. | |
| 9,848,273 B1 | 12/2017 | Helwani et al. | |
| 9,940,928 B2 | 4/2018 | Haubrich et al. | |
| 10,605,470 B1* | 3/2020 | Saxena | G06N 7/005 |
| 11,304,013 B2 | 4/2022 | Burwinkel et al. | |
| 2005/0172006 A1 | 8/2005 | Hsiang | |
| 2005/0231356 A1 | 10/2005 | Bish et al. | |
| 2006/0023900 A1 | 2/2006 | Erhart et al. | |
| 2008/0140868 A1 | 6/2008 | Kalayjian et al. | |
| 2009/0031336 A1 | 1/2009 | Chavez et al. | |
| 2012/0060176 A1 | 3/2012 | Chai et al. | |
| 2012/0102409 A1 | 4/2012 | Fan et al. | |
| 2014/0223461 A1 | 8/2014 | Hatambeiki et al. | |
| 2015/0105029 A1* | 4/2015 | Russell | H04W 4/80 455/67.11 |
| 2017/0318145 A1 | 11/2017 | Gibbons | |
| 2017/0332183 A1 | 11/2017 | Shennib | |
| 2018/0204576 A1 | 7/2018 | Dhoot et al. | |
| 2018/0317837 A1 | 11/2018 | Burwinkel et al. | |
| 2018/0343527 A1 | 11/2018 | Edwards | |
| 2019/0246216 A1 | 8/2019 | Frederiksen et al. | |
| 2019/0278555 A1* | 9/2019 | Carvajal | G06F 3/165 |
| 2019/0281389 A1* | 9/2019 | Gordon | G06F 16/687 |
| 2020/0069281 A1 | 3/2020 | Chan et al. | |
| 2020/0086133 A1 | 3/2020 | Wang et al. | |
| 2020/0260199 A1 | 8/2020 | Burwinkel et al. | |
| 2020/0288251 A1 | 9/2020 | Kuipers | |
| 2022/0286792 A1 | 9/2022 | Burwinkel et al. | |
| 2022/0337962 A1* | 10/2022 | Degen | H04R 25/505 |
| 2023/0020019 A1 | 1/2023 | Bhowmik et al. | |

FOREIGN PATENT DOCUMENTS

| | | |
|---|---|---|
| EP | 3176782 | 6/2017 |
| WO | 2017120065 | 7/2017 |
| WO | 2020163722 | 8/2020 |
| WO | 2020236911 | 11/2020 |
| WO | 2021041522 | 3/2021 |
| WO | 2021127226 | 6/2021 |

OTHER PUBLICATIONS

"How NFL Equipment Works," HowStuffWorks article that mentions wireless communication in NFL helmets has been used since 1994. Accessible at URL <https://entertainment.howstuffworks.com/fb-equip5.htm> at least as early as Apr. 9, 2003 (28 pages).

"International Search Report and Written Opinion," for PCT Application No. PCT/US2020/065682 dated Mar. 16, 2021 (15 pages).

Allan, Patrick "Build some DIY, Smart Switching Baby Monitor Headphones," Synopsis of Ben Heck Show episode. Published Jan. 4, 2017 and accessible at URL <https://lifehacker.com/build-some-diy-smart-switching-baby-monitor-headphones-1790775604> (4 pages).

Martins Pereira, Cesar Augusto, et al. "Development and Evaluation of a Head-Controlled Human-Computer Interface with Mouse-Like Functions for Physically Disabled Users," Clinics 2009; 64(10): 975-81 (8 pages).

Zhang, Ben, et al. "HOBS: Head Orientation-Based Selection in Physical Spaces," SUI 2014, Oct. 4-5, Honolulu, HI, USA.

"International Preliminary Report on Patentability," for PCT Application No. PCT/US2020/017222 dated Aug. 19, 2021 (14 pages).

"International Preliminary Report on Patentability," for PCT/US2020/047967 dated Mar. 10, 2022 (9 pages).

"International Preliminary Report on Patentability," for PCT Application No. PCT/US2020/065682 dated Jun. 30, 2022 (11 pages).

"International Search Report and Written Opinion," for PCT Application No. PCT/US2020/017222 dated Jul. 6, 2020 (21 pages).

"International Search Report and Written Opinion," for PCT Application No. PCT/US2020/047967 dated Oct. 22, 2020 (13 pages).

"Invitation to Pay Additional Fees," for PCT Application No. PCT/US2020/017222 dated May 13, 2020 (17 pages).

"Non-Final Office Action," for U.S. Appl. No. 16/784,947 dated Jul. 23, 2021 (17 pages).

"Non-Final Office Action," for U.S. Appl. No. 17/700,926 dated Jan. 17, 2023 (17 pages).

"Notice of Allowance," for U.S. Appl. No. 16/784,947 dated Dec. 9, 2021 (10 pages).

"Response to Non-Final Office Action," for U.S. Appl. No. 16/784,947 dated Sep. 20, 2021 (9 pages).

* cited by examiner

EAR-WEARABLE DEVICES FOR CONTROL OF OTHER DEVICES AND RELATED METHODS

This application claims the benefit of U.S. Provisional Application No. 63/085,281, filed Sep. 30, 2020, the content of which is herein incorporated by reference in its entirety.

FIELD

Embodiments herein relate to ear-wearable devices. More specifically, embodiments herein can be used to control other device and related methods.

BACKGROUND

The modern human environment includes many different devices, many of which have controllable features. For example, televisions have many different controls including power controls, volume controls, channel controls, recording controls, and the like. Modern thermostats have many different controls including power controls, current temperature setting controls, temperature settings pattern controls by time of day and day of week, zone controls, and the like. Modern ovens have many different controls including temperature controls, time clock controls, alarm controls, and the like. Devices with controllable features occur in home environments, work environments, and recreational environments.

However, utilizing controllable features remains challenging. In some cases, the controllable device may come with a remote-control device (such as an infrared or RF remote). However, remote control devices are frequently complex and can be difficult to use to engage even simple features. As a result, some devices have begun to implement voice control features. Voice control features can be advantageous as issuing voice commands can be more intuitive than pushing a sequence of events. However, there are frequently multiple controllable devices within listening range of a user, thus there are many opportunities for confusion as a command intended for one device may elicit a response from an unintended device. Further, many devices may not have sufficient processing resources to have any voice control capabilities whatsoever.

SUMMARY

Embodiments herein relate to ear-wearable devices that can be used to control other device and related methods. In a first aspect, an ear-wearable device is included having a control circuit, a wireless communications circuit, wherein the wireless communications circuit is in electronic communication with the control circuit, a microphone, wherein the microphone is in electronic communication with the control circuit, and a motion sensor, wherein the motion sensor is in electronic communication with the control circuit. The ear-wearable device is configured to receive an input from a wearer of the ear-wearable device, select a controllable device to be controlled based on factors including at least one of physical proximity between the ear-wearable device and the controllable device and a direction that the head of the wearer is pointing, and issue a control command to the controllable device.

In a second aspect, in addition to one or more of the preceding or following aspects, or in the alternative to some aspects, the ear-wearable device further can include an electroacoustic transducer, wherein the electroacoustic transducer is in electrical communication with the control circuit.

In a third aspect, in addition to one or more of the preceding or following aspects, or in the alternative to some aspects, the direction that the head of the wearer is pointing is determined based on the orientation of the ear-wearable device.

In a fourth aspect, in addition to one or more of the preceding or following aspects, or in the alternative to some aspects, the direction that the head of the wearer is pointing is determined based on the position of the ear-wearable device and a second ear-wearable device worn by the wearer.

In a fifth aspect, in addition to one or more of the preceding or following aspects, or in the alternative to some aspects, at least one of the physical proximity and the direction that the head of the wearer is pointing is determined by receiving a signal from the controllable device.

In a sixth aspect, in addition to one or more of the preceding or following aspects, or in the alternative to some aspects, the received signal is an ultrasonic signal.

In a seventh aspect, in addition to one or more of the preceding or following aspects, or in the alternative to some aspects, the ear-wearable device is configured to send a location request command to one or more controllable devices, the location request command configured to cause the controllable devices to emit a locating signal.

In an eighth aspect, in addition to one or more of the preceding or following aspects, or in the alternative to some aspects, the locating signal is an ultrasonic signal.

In a ninth aspect, in addition to one or more of the preceding or following aspects, or in the alternative to some aspects, the ear-wearable device is configured to calculate a present geolocation of the ear-wearable device wearer.

In a tenth aspect, in addition to one or more of the preceding or following aspects, or in the alternative to some aspects, the ear-wearable device is configured to calculate the present geolocation of the wearer of the ear-wearable device by utilizing at least one selected from the group consisting of angle of arrival, angle of departure, cell identity, time of arrival, time difference of arrival, and Rx power level.

In an eleventh aspect, in addition to one or more of the preceding or following aspects, or in the alternative to some aspects, the ear-wearable device is further configured to classify the input from the wearer of the ear-wearable device according to a type of command.

In a twelfth aspect, in addition to one or more of the preceding or following aspects, or in the alternative to some aspects, the ear-wearable device is configured to limit a set of controllable devices to be controlled based on the classification.

In a thirteenth aspect, in addition to one or more of the preceding or following aspects, or in the alternative to some aspects, the ear-wearable device is configured to detect movement of the wearer of the ear-wearable device and include the detected movement as a factor for selection of a controllable device to be controlled.

In a fourteenth aspect, in addition to one or more of the preceding or following aspects, or in the alternative to some aspects, the ear-wearable device is configured to not select a controllable device for control in a geospatial area if the detected movement indicates that the wearer is leaving that geospatial area.

In a fifteenth aspect, in addition to one or more of the preceding or following aspects, or in the alternative to some aspects, the geospatial area includes a room.

In a sixteenth aspect, in addition to one or more of the preceding or following aspects, or in the alternative to some aspects, the geospatial area includes a floor of a building.

In a seventeenth aspect, in addition to one or more of the preceding or following aspects, or in the alternative to some aspects, the ear-wearable device is configured to select a controllable device for control in a geospatial area if the detected movement indicates that the wearer is entering that geospatial area.

In an eighteenth aspect, in addition to one or more of the preceding or following aspects, or in the alternative to some aspects, the ear-wearable device is configured to detect a current time and include the current time as a factor for selection of a controllable device to be controlled.

In a nineteenth aspect, in addition to one or more of the preceding or following aspects, or in the alternative to some aspects, the ear-wearable device is configured to record activity of the wearer and derive an activity pattern of the wearer based on the recorded activity.

In a twentieth aspect, in addition to one or more of the preceding or following aspects, or in the alternative to some aspects, the ear-wearable device is configured to include the derived activity pattern as a factor for selection of a controllable device to be controlled.

In a twenty-first aspect, in addition to one or more of the preceding or following aspects, or in the alternative to some aspects, the activity pattern includes waking in the night and entering a bathroom.

In a twenty-second aspect, in addition to one or more of the preceding or following aspects, or in the alternative to some aspects, the input from the wearer includes at least one of an audio input, a detected motion of the ear-wearable device, and a touch input.

In a twenty-third aspect, in addition to one or more of the preceding or following aspects, or in the alternative to some aspects, the ear-wearable device is configured to provide an output to the wearer indicating the controllable device that is selected to be controlled.

In a twenty-fourth aspect, in addition to one or more of the preceding or following aspects, or in the alternative to some aspects, the ear-wearable device is configured to receive a confirmation input from the wearer.

In a twenty-fifth aspect, in addition to one or more of the preceding or following aspects, or in the alternative to some aspects, the ear-wearable device further can include a magnetometer.

In a twenty-sixth aspect, in addition to one or more of the preceding or following aspects, or in the alternative to some aspects, the ear-wearable device is configured to determine an orientation of the ear-wearable device utilizing at least one of the motion sensor and the magnetometer.

In a twenty-seventh aspect, a method of controlling a controllable device is included, the method including receiving an input with an ear-wearable device, selecting the controllable device to be controlled based on factors including at least one of physical proximity between the ear-wearable device and the controllable device and a direction that the head of the wearer is pointing, and issuing a control command to the controllable device with the ear-wearable device.

In a twenty-eighth aspect, in addition to one or more of the preceding or following aspects, or in the alternative to some aspects, the method can further include determining the direction that the head of the wearer is pointing is based on the orientation of the ear-wearable device.

In a twenty-ninth aspect, in addition to one or more of the preceding or following aspects, or in the alternative to some aspects, the method can further include determining the direction that the head of the wearer is pointing based on the ear-wearable device and a second ear-wearable device worn by the wearer.

In a thirtieth aspect, in addition to one or more of the preceding or following aspects, or in the alternative to some aspects, wherein at least one of the physical proximity and the direction that the head of the wearer is pointing is determined by receiving a signal from the controllable device.

In a thirty-first aspect, in addition to one or more of the preceding or following aspects, or in the alternative to some aspects, the signal is an ultrasonic signal.

In a thirty-second aspect, in addition to one or more of the preceding or following aspects, or in the alternative to some aspects, the method can further include sending a location request command to one or more controllable devices, the location request command configured to cause the controllable devices to emit a locating signal.

In a thirty-third aspect, in addition to one or more of the preceding or following aspects, or in the alternative to some aspects, the locating signal is an ultrasonic signal.

In a thirty-fourth aspect, in addition to one or more of the preceding or following aspects, or in the alternative to some aspects, the method can further include calculating a present geolocation of the ear-wearable device wearer.

In a thirty-fifth aspect, in addition to one or more of the preceding or following aspects, or in the alternative to some aspects, wherein calculating a present geolocation of the ear-wearable device wearer further includes utilizing at least one selected from the group consisting of angle of arrival, angle of departure, cell identity, time of arrival, time difference of arrival, and Rx power level.

In a thirty-sixth aspect, in addition to one or more of the preceding or following aspects, or in the alternative to some aspects, the method can further include detecting movement of the wearer and including detected movement as a factor for selection of a controllable device to be controlled.

In a thirty-seventh aspect, in addition to one or more of the preceding or following aspects, or in the alternative to some aspects, the method can further include selecting a controllable device for control in a geospatial area if the detected movement indicates that the wearer is entering that geospatial area.

In a thirty-eighth aspect, in addition to one or more of the preceding or following aspects, or in the alternative to some aspects, the geospatial area includes a floor of a building.

In a thirty-ninth aspect, in addition to one or more of the preceding or following aspects, or in the alternative to some aspects, the geospatial area includes a room.

In a fortieth aspect, in addition to one or more of the preceding or following aspects, or in the alternative to some aspects, further can include not selecting a controllable device for control in a geospatial area if the detected movement indicates that the wearer is leaving that geospatial area.

In a forty-first aspect, in addition to one or more of the preceding or following aspects, or in the alternative to some aspects, the method can further include detecting a current time and including the current time as a factor for selection of a controllable device to be controlled.

In a forty-second aspect, in addition to one or more of the preceding or following aspects, or in the alternative to some aspects, the method can further include recording activity of the wearer and deriving an activity pattern of the wearer based on the recorded activity.

In a forty-third aspect, in addition to one or more of the preceding or following aspects, or in the alternative to some aspects, the activity pattern includes waking in the night and entering a bathroom.

In a forty-fourth aspect, in addition to one or more of the preceding or following aspects, or in the alternative to some aspects, the ear-wearable device is configured to include the derived activity pattern as a factor for selection of a controllable device to be controlled.

In a forty-fifth aspect, in addition to one or more of the preceding or following aspects, or in the alternative to some aspects, the input from the wearer includes at least one of an audio input, a detected motion of the ear wearable device, and a touch input.

In a forty-sixth aspect, in addition to one or more of the preceding or following aspects, or in the alternative to some aspects, the method can further include providing an output to the wearer indicating the controllable device that is selected to be controlled.

In a forty-seventh aspect, in addition to one or more of the preceding or following aspects, or in the alternative to some aspects, the method can further include receiving a confirmation input from the wearer.

In a forty-eighth aspect, in addition to one or more of the preceding or following aspects, or in the alternative to some aspects, the method can further include determining an orientation of the ear-wearable device by utilizing at least one of a motion sensor and the magnetometer.

In a forty-ninth aspect, an ear-wearable device is included having a control circuit, a wireless communications circuit, wherein the wireless communications circuit is in electronic communication with the control circuit, a microphone, wherein the microphone is in electronic communication with the control circuit, and a motion sensor, wherein the motion sensor is in electronic communication with the control circuit. The ear-wearable device is configured to receive an input from a wearer of the ear-wearable device, select a controllable device to be controlled based on factors including a physical proximity between the ear-wearable device and the controllable, and issue a control command to the controllable device.

In a fiftieth aspect, in addition to one or more of the preceding or following aspects, or in the alternative to some aspects, the ear-wearable device is configured to narrow a set of possible controllable devices down to a subset based on physical proximity between the ear-wearable device and the set of possible controllable devices.

In a fifty-first aspect, in addition to one or more of the preceding or following aspects, or in the alternative to some aspects, the ear-wearable is configured to select at least one controllable device from the subset to issue a control command to based on the input from the wearer of the ear-wearable device.

In a fifty-second aspect, a method of controlling a controllable device is included, the method including receiving an input with an ear-wearable device, selecting the controllable device to be controlled based on factors including a physical proximity between the ear-wearable device and the controllable device, and issuing a control command to the controllable device with the ear-wearable device.

In a fifty-third aspect, in addition to one or more of the preceding or following aspects, or in the alternative to some aspects, the method can further include narrowing a set of possible controllable devices down to a subset based on physical proximity between the ear-wearable device and the set of possible controllable devices.

In a fifty-fourth aspect, in addition to one or more of the preceding or following aspects, or in the alternative to some aspects, the method can further include selecting at least one controllable device from the subset to issue a control command to based on the received input.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, the modern human environment includes many different devices, many of which are have controllable features (e.g., controllable devices). Some devices have begun to implement voice control features. However, in an environment with multiple voice-controllable devices, there can be substantial confusion over which device is intended to be controlled. Further, many devices lack voice-control features.

Embodiments herein include ear-wearable devices that can be used to control controllable devices and related methods. The device that can be controlled can include even those with no voice control features whatsoever. As one example, an ear-wearable device is included with components including a control circuit, a wireless communications circuit, a microphone, and a motion sensor. In an embodiment, the ear-wearable device can be configured to receive an input from a wearer of the ear-wearable device, then select a controllable device to be controlled based on various factors (described in greater detail below), and issue a control command to the controllable device. As such, the ear-wearable device can effectually discern the intended recipient of the command and issue and/or address the command accordingly. In this way, the ear-wearable devices herein can make commands more effective and easier for device wearers to issue as well as enable even devices with no voice control features to be controlled by voice.

Figure 1:
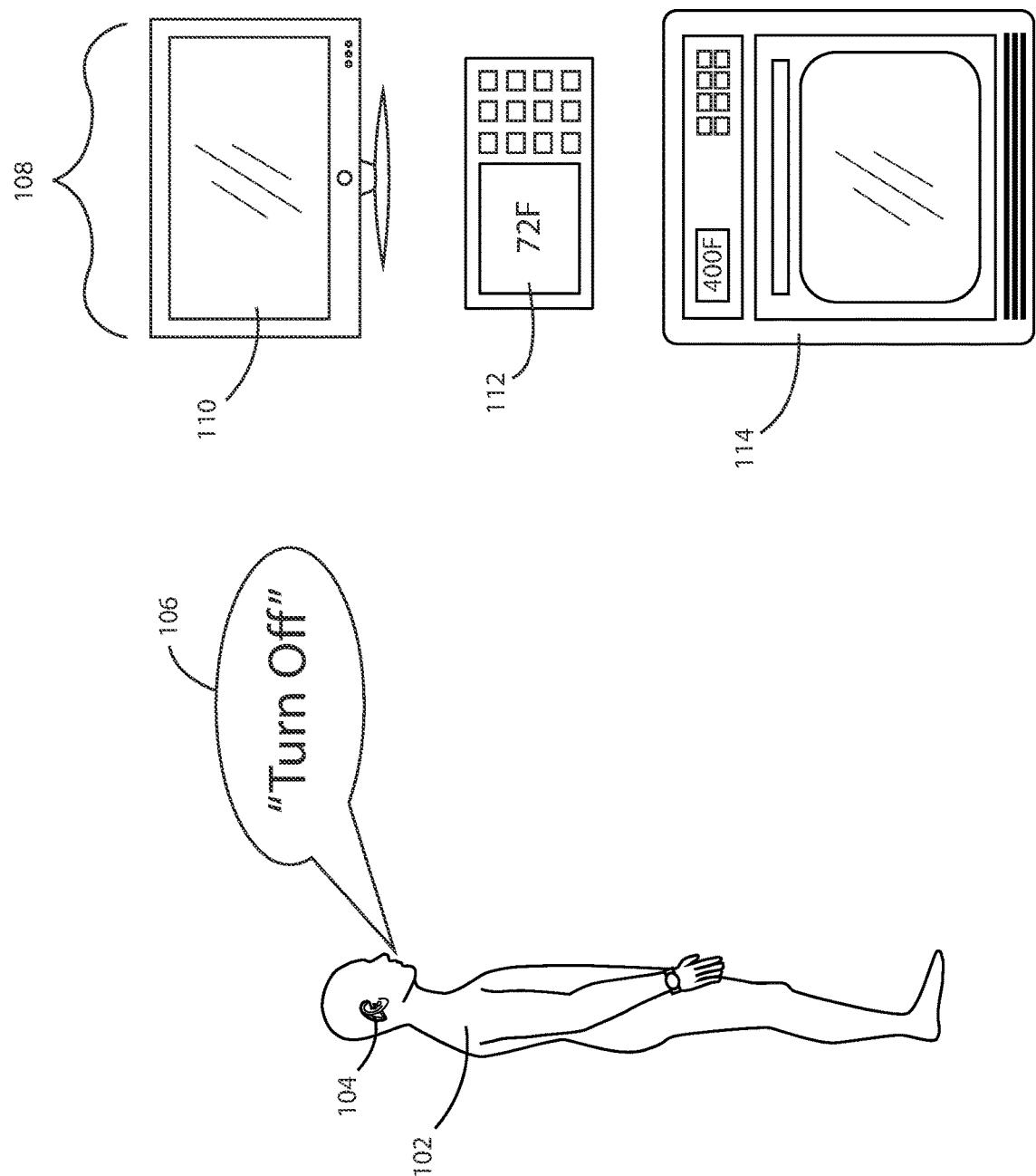
FIG. 1 is a schematic view of some components of an ear-wearable device system in accordance with various embodiments herein.

Referring now to FIG. 1, a schematic view is shown of some components of an ear-wearable device system in accordance with various embodiments herein. A device wearer 102 is shown wearing an ear-wearable device 104. The ear-wearable device 104 can be configured to receive an input from a wearer 102 of the ear-wearable device 104, such as a command for a controllable device 108 (or device to be controlled). The input 106 from the device wearer 102 can take a number of different forms. In various embodiments, the input from the device wearer 102 includes at least one of an audio input, a detected motion of the ear-wearable device 104, and a touch input. In some embodiments, the input 106 specifically takes the form of a spoken command. The command can relate to many different aspects of device operation, such as power state, volume, channel, temperature, time, product specific functions, and the like.

The controllable device 108 can be a device that is capable of receiving a command. In this particular example, the controllable device 108 can be one of a television 110, a thermostat 112, and an oven 114. While the device wearer 102 intends the input 106 (or command) to relate to a specific controllable device, the command itself may not be given with sufficient information to allow unintended controllable devices to recognize that the command is not intended for them. For example, if the input 106 takes the form of the words "turn off", this is ambiguous and can be confused as being intended for any of the television 110, the thermostat 112, or the oven 114. However, if the wrong second device responds to the command, it can be frustrating for the device wearer 102. With repeated experience of having the wrong device respond to a command, the device wearer 102 can quickly lose confidence in issuing verbal commands and stop doing so altogether.

However, in various embodiments herein, the ear-wearable device 104 is configured to select an appropriate controllable device 108 to be controlled. The ear-wearable device 104 can sense (directly or indirectly) many different aspects that provide context for the input/command from the wearer 102 that allow the correct controllable device to be selected. By way of example, the ear-wearable device 104 can be configured to select an appropriate controllable device 108 based on factors such as physical proximity between the ear-wearable device 104 and the controllable device 108 and a direction that the head of the wearer 102 is pointing. Many other factors can also be used to select the appropriate device as detailed below.

In various embodiments, the ear-wearable device 104 is configured to provide an output to a wearer 102 indicating a controllable device 108 that is selected to be controlled. For example, the ear-wearable device 104 can play a message for the wearer 102 such as "the television will now be shut off". In various embodiments, the ear-wearable device 104 is configured to monitor for and/or receive a confirmation input from a wearer 102. The input can take various forms including at least one of an audio input, a detected motion of the ear-wearable device 104, and a touch input. For example, if the wearer 102 heard the message regarding the television 110, but instead intended to shut off the light they could say "no, please shut off the light". In this case, the ear-wearable device could halt in sending a control command directed to the television 110 and check a table (described further below) of controllable devices for one that matches the description of a light and issue the control command to that controllable device instead.

In some embodiments, confirmation can be configured by ear-wearable device or the system based on the identity/type of the controllable device. For example, safety concerns may mandate that confirmation always be required for turning the oven on or changing settings on a thermostat. Conversely, control of other controllable devices that follow a pattern temporal/spatial/activity/etc. and commands consistent with the pattern may not be subject to confirmation. For example, if a device wearer follows a pattern of providing certain input to the system at a certain time, at a certain location, or while undertaking a certain activity, then if the device wearer provides that input in a manner that is consistent with the predetermined patterns, then a confirmation can be skipped. Thus, in various embodiments herein, the ear-wearable device or system can determine whether confirmation should be solicited from the device wearer.

In some embodiments, the ear-wearable device or system can even initiate a process of issuing control commands in the absence of an input from the ear-wearable device wearer. For example, if there is an established pattern (such as described above) in some embodiments the ear-wearable device can issue control commands to one or more controllable devices in accord with the pattern and then, in some cases, the ear-wearable device can announce for the device wearer what control command has been issued and to which controllable devices.

In some embodiments, control commands can take the form of a single command to a single controllable device. For example, a control command issued to a television can be as simple as an instruction to raise the volume by one increment. However, in other embodiments, control commands can take the form of multiple commands issued to multiple controllable devices. For example, an input/command from the wearer 102 to "watch television" may result in a control command to the television to turn on, a control command to the television to adjust the volume to a certain preset level, a control command to a lamp near the television to turn on, and a control command to a room fan to turn on. In other scenarios, an input/command from the wearer 102 provided in the middle of the night to "turn on light" may result in a sequence of control commands to multiple lights associated with a path to a bathroom and, specifically, turning on such lights with a dimmer function. In some embodiments, the sequence of control commands can also include those to turn off lights after the wearer is no longer in the bathroom. In some embodiments, such detailed control command sequences can be stored as a part of one or more presets.

In some embodiments, as part of a preset, such sequences of commands can be issued automatically such as at a certain time and/or when an action is detected. For example, if a motion sensor or IMU that is part of the ear-wearable device detects that the device wearer has risen from their bed in the middle of the night then the preset for providing bathroom lighting can be initiated automatically resulting in control commands being issued for the bathroom lighting without the device wearer having to provide an input/command. Automatic initiation of a sequence can be used for high probability routines, and may, or may not, involve any auditory interaction between user and system. Automatic initiation of a sequence can also, in some embodiments, be terminated by a verbal or non-verbal override input from the device wearer.

After selection, and sometimes confirmation, of the appropriate controllable device 108, the ear-wearable device 104 can then be configured to issue (directly or indirectly) a control command to the selected controllable device 108.

Figure 2:
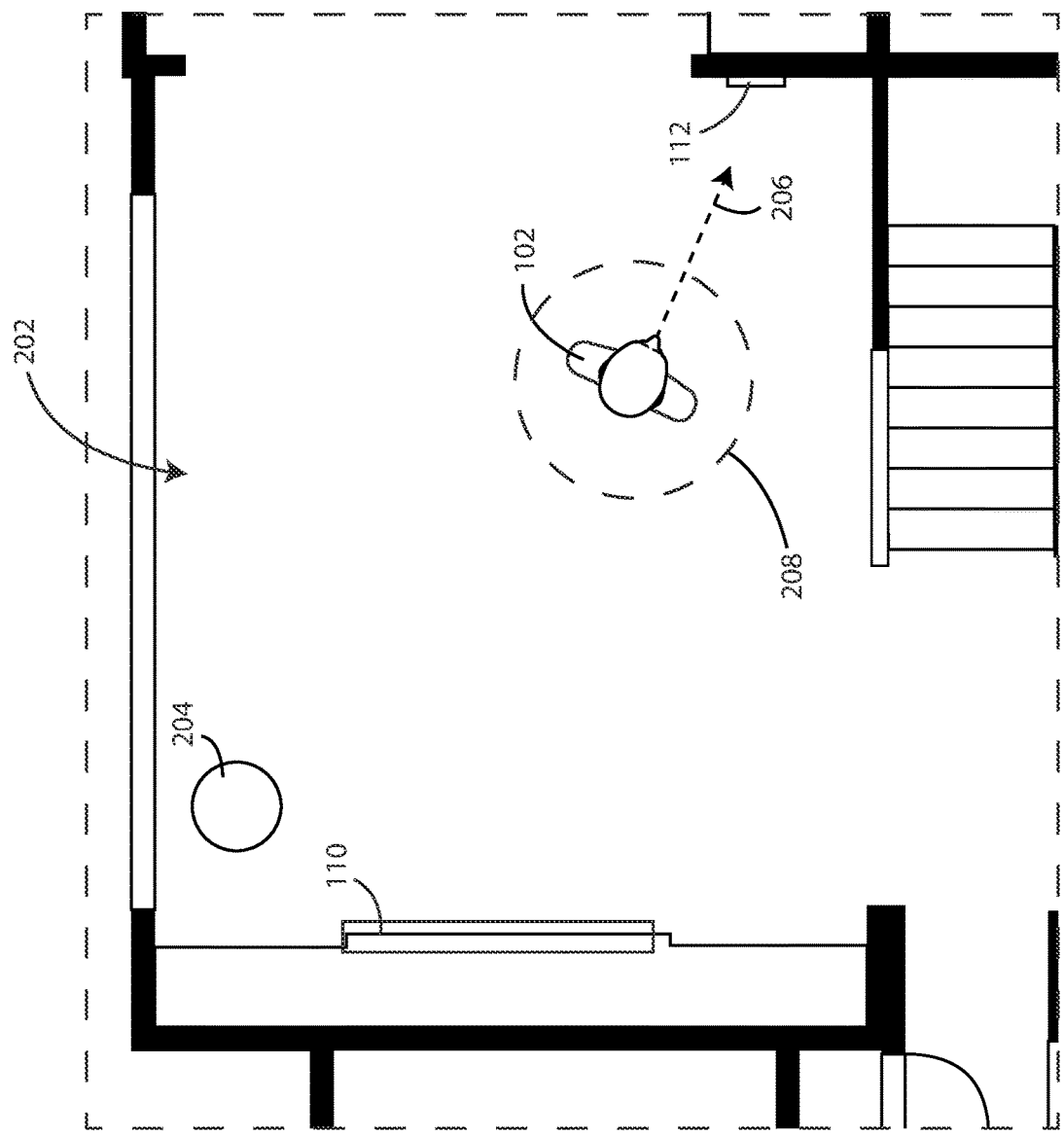
FIG. 2 is a plan view of a room in accordance with various embodiments herein.

It will be appreciated that many different factors can be considered in order for the ear-wearable device 104 to select the appropriate controllable device to issue the control command to. Some of these factors will be illustrated with respect to FIG. 2. FIG. 2 shows a plan view of a room 202 is shown in accordance with various embodiments herein. A device wearer 102 is in the room 202. The room 202 includes various controllable devices including a television 110, a thermostat 112, and a lamp 204. While not shown in this view, the device wearer 102 can be wearing an ear-wearable device 104 in order to aid in controlling the controllable devices within the room 202.

One factor that can be used by ear-wearable device 104 is the direction that the device wearer 102 is facing (e.g., the direction that the head of the wearer 102 is facing). This direction can be determined in various ways. In some embodiments, the direction that the head of the wearer 102 is pointing can be determined based on the orientation of the ear-wearable device 104 (since the ear-wearable device 104 is typically being worn by the wearer 102). The orientation of the ear-wearable device 104 can, in turn, be determined using various sensors therein such as a motion sensor (which could include one or more of an accelerometer, a gyroscope, etc.), a magnetometer, as well as other sensors. In many cases, a device wearer 102 may be wearing two ear-wearable devices (e.g., a device for each ear). In some scenarios, the direction that the head of the wearer 102 is pointing can be determined more accurately by using two devices. Thus, in various embodiments, direction can be based on the ear-wearable device 104 and a second ear-wearable device (not shown in this view) worn by the device wearer 102.

In some embodiments, the direction that the head of the wearer 102 is pointing can be determined by receiving a signal from a controllable device 108. For example, if the wearer 102 is wearing two ear-wearable device (one on each ear), unless the wearer 102 is directly facing the particular controllable device (or directly facing away from the particular controllable device), then the time at which a wireless signal (such as an ultrasonic signal) emitted by the controllable device arrives at each ear-wearable device will vary. By analyzing the respective arrival times at each ear, the direction that the head of the wearer 102 is facing with respect to a given controllable device can be calculated.

In the example of FIG. 2, the device wearer 102 is facing a particular direction 206. The direction 206 can be used as a factor in order to determine the correct device to be controlled. For example, in this view the device wearer 102 is facing in a direction 206 that most closely matches the position of the thermostat 112 in comparison to the other controllable devices that are in the room 202. However, even if the direction 206 cannot be determined with sufficient accuracy to narrow possible controllable devices down to a single controllable device, the direction 206 can still enable the ear-wearable device or another component of the system to narrow down a set of devices to a subset of devices in the area of the user. It will be appreciated that this can facilitate greatly simplifying voice commands (e.g. "lamp ON" instead of "master bedroom, left nightstand lamp ON"). As such, this can unburden the user significantly so as not to require them to remember a unique name for each individual controllable device in a whole house full of IoT enabled/controllable devices.

In some embodiments, a map of an occupiable structure such as a house can be generated automatically by the ear-wearable device and/or system. For example, as the ear-wearable device is moved (as the wearer moves) throughout the occupiable structure, records relating particular controllable devices with areas/zones/rooms can be stored to progressively build the map of the structure. This map can then be utilized by the ear-wearable device or system in the process of selecting one or more controllable devices to issue a control command to. In some embodiments, the map can be utilized by the ear-wearable device to reduce a set of possible controllable devices down to a subset of possible controllable devices.

Another factor that can be used by ear-wearable device 104 is the distance between the ear-wearable device 104 and the various controllable devices from which the ear-wearable device 104 must select one. By virtue of the ear-wearable device 104 being worn by the device wearer 102, the distance can also be thought of as the distance between the device wearer 102 (or a present geolocation 208 of the device wearer 102) and the various controllable devices.

In the example of FIG. 2, the device wearer 102 is at a distance from the thermostat 112 that is less than the distance between the device wearer 102 and any of the other controllable devices within the room 202. As such, the distance factor would favor the thermostat 112 over the other controllable devices in the room 202.

In some embodiments, the ear-wearable device is configured to utilize physical proximity between the ear-wearable device and controllable devices in order to select a controllable device to be controlled and/or narrow a set of possible controllable devices down to a subset of possible controllable devices to which to issue a control command, even in the absence of information of a particular direction that the device wearer is facing. In scenarios where the set of possible controllable devices have been narrowed down to a subset, other factors such as the context of the input from the wearer of the ear-wearable device can be used to further reduce the subset down to a single controllable device or a smaller set of controllable devices to which to issue a control command.

Distance can be determined in various ways. In some embodiments, distance can be determined by determining the geospatial location of the ear-wearable device 104 (as described in greater detail below) and comparing it with a geospatial location of the controllable device 108, such as may be stored in a configuration table in the ear-worn device.

In some embodiments, aspects relevant for selecting an appropriate controllable device 108 can be derived by receiving and/or evaluating a signal from one or more controllable devices. For example, in various embodiments, distance between the ear-wearable device 104 and a controllable device 108 can be determined by way of a signal from a controllable device 108. For example, in some embodiments, the controllable device 108 can emit an ultrasonic signal that is reflected by the device wearer 102 and the time that it takes for the sound wave to return can be used to determine the distance travelled by the sound wave before being reflected by the device wearer 102 (e.g., like sonar).

In some embodiments, wireless signals bearing a time stamp can be emitted by the controllable device 108 and received by the ear-wearable device 104 and then the distance can be derived by evaluating the time stamp time versus the actual time of arrival at the ear-wearable device 104. In some embodiments, such roles can be reversed so that the signals are emitted by the ear-wearable device 104 and received by the controllable device 108.

In some embodiments, the ear-wearable device 104 can be configured to send a location request command to one or more controllable devices. The location request command can be configured to cause the controllable devices to emit a locating signal. Locating signals can take various forms. In various embodiments, the locating signal is an ultrasonic signal.

In various embodiments, the ear-wearable device 104 is configured to calculate a present geolocation 208 of the ear-wearable device 104 wearer. The present geolocation 208 can be used for various purposes including determining a distance between the wearer and each possible controllable device as well as determining which room or geospatial location of significance the wearer is currently in or about to enter or leave In various embodiments, the ear-wearable device 104 is configured to calculate a present geolocation 208 of a wearer of the ear-wearable device 104 (and/or another factor used in making a selection of a controllable device herein) by utilizing at least one selected from the group consisting of angle of arrival, angle of departure, cell identity, time of arrival, time difference of arrival, and Rx power level.

In some embodiments, a present geolocation can be determined based on e911 smartphone location information that can be passed from a smartphone (such as one belonging to the ear-wearable device wearer) to the ear-wearable device.

Angle of arrival and angle of departure can be used to determine a direction as well as a distance. Angle of arrival (AoA) and angle of departure (AoD) make use of the angular phase-shifts that occur between antennas as they receive (AoA) or transmit (AoD) RF signals. Time of arrival (ToA) is the travel time of a radio signal from a single transmitter to a remote single receiver, and its measurement is facilitated if both the transmitter and the receiver have (or receive signals from) the same clock or synchronized clocks. As such, time of arrival increases with increasing distance and therefore can be used to determined distance. Time difference of arrival at two points can be used to determine both distance and direction. Rx power level (or received signal strength indicator—RSSI) decreases with increasing distance. As such, evaluation of Rx power level can be used to determine distance. Measures of direction and distance can be combined in order to determine present geolocation referentially.

In some embodiments, a present geolocation can be determined through dead reckoning off the double-integration of an acceleration sensor signal (or IMU signal) providing distance moved and direction once an accurate location has been determined. In some embodiments, dead reckoning can be performed relative to a calibrated beacon or other device with a known location, which could be a TV, smoke alarm, stove, or the like.

In some embodiments, the ear-wearable device 104 or another device in communication with the ear-wearable device 104 can include a spatial locator circuit. The spatial locator circuit can interface with various devices/systems in order to determine current spatial location via coordinates, referential signal, referential device, or the like. By way of example, the spatial locators circuit can interface with one or more of a device-to-device location service, a BLUETOOTH® beacon, a cell tower (or triangulation with multiple cell towers), a WIFI® router, a satellite (GPS L1/L2, GLONASS G1/G2, BeiDou B1/B2, Galileo E1/E5b, SBAS, or the like), or a telecoil loop cable, amongst other devices/systems. It will be appreciated that these specific examples are not exclusive and that various other techniques of determining location are also contemplated herein. In some embodiments, the spatial location determining device may determine location to a level of accuracy of 10 meters, 5 meters, 1 meter, 50 centimeters, 10 centimeters, 5 centimeters, or less, or a distance falling within a range between any of the foregoing.

In various embodiments, the spatial locator circuit can include a satellite signal receiver circuit. In various embodiments, the spatial locator circuit can include a device-to-device locator circuit. In various embodiments, the spatial locator circuit can include an electromagnetic sensor to detect the presence of a telecoil loop cable.

In various embodiments, the ear-wearable device 104 is configured to detect movement of the wearer of the ear-wearable device 104 and include the detected movement as a factor for selection of a controllable device 108 to be controlled. Movement can be applied in selecting a controllable device in various ways. In some embodiments, movement toward a particular controllable device can be used as a factor in selecting a controllable device. In some embodiments, movement toward or away from a geospatial area of significance can be used as a factor in selecting a controllable device. In some embodiments, movement toward or away from an entrance to a geospatial area of significance (such as a door or a passageway) can be used as a factor in selecting a controllable device. In various embodiments, the geospatial area comprises a room. In various embodiments, the geospatial area comprises a floor of a building.

As such, in various embodiments herein, the ear-wearable device 104 can be configured to detect movement of the wearer of the ear-wearable device 104 and the direction of movement of the device wearer can be used as a factor to determine the correct controllable device to issue a command to or at least can be used as a factor to narrow down the set of possible controllable devices to a subset.

For example, if a device wearer is exiting a living room and heading toward a kitchen, then it is highly probable that a command given by the device wearer is intended to be for control of a controllable device in the kitchen and not in the living room. Thus, in some embodiments, the ear-wearable device 104 is configured to deprioritize controllable devices that are in a geospatial area that the wearer is leaving. In some embodiments, the ear-wearable device 104 is configured to prioritize controllable devices that are in a geospatial area that the wearer is entering.

However, the context/nature of the command from the device wearer can be also be considered. For example, if the device wearer is exiting a living room and provides a command/input to "turn off lights", then it is highly probable that the device wearer intended to control lights in the room that the wearer is leaving. Thus, in some embodiments, the ear-wearable device 104 is configured to prioritize controllable devices that are in a geospatial area that the wearer is leaving if the context of the command favors control in an area that is being vacated (such as a command to turn a device off). In some embodiments, the ear-wearable device 104 is configured to deprioritize controllable devices that are in a geospatial area that the wearer is entering.

Figure 3:
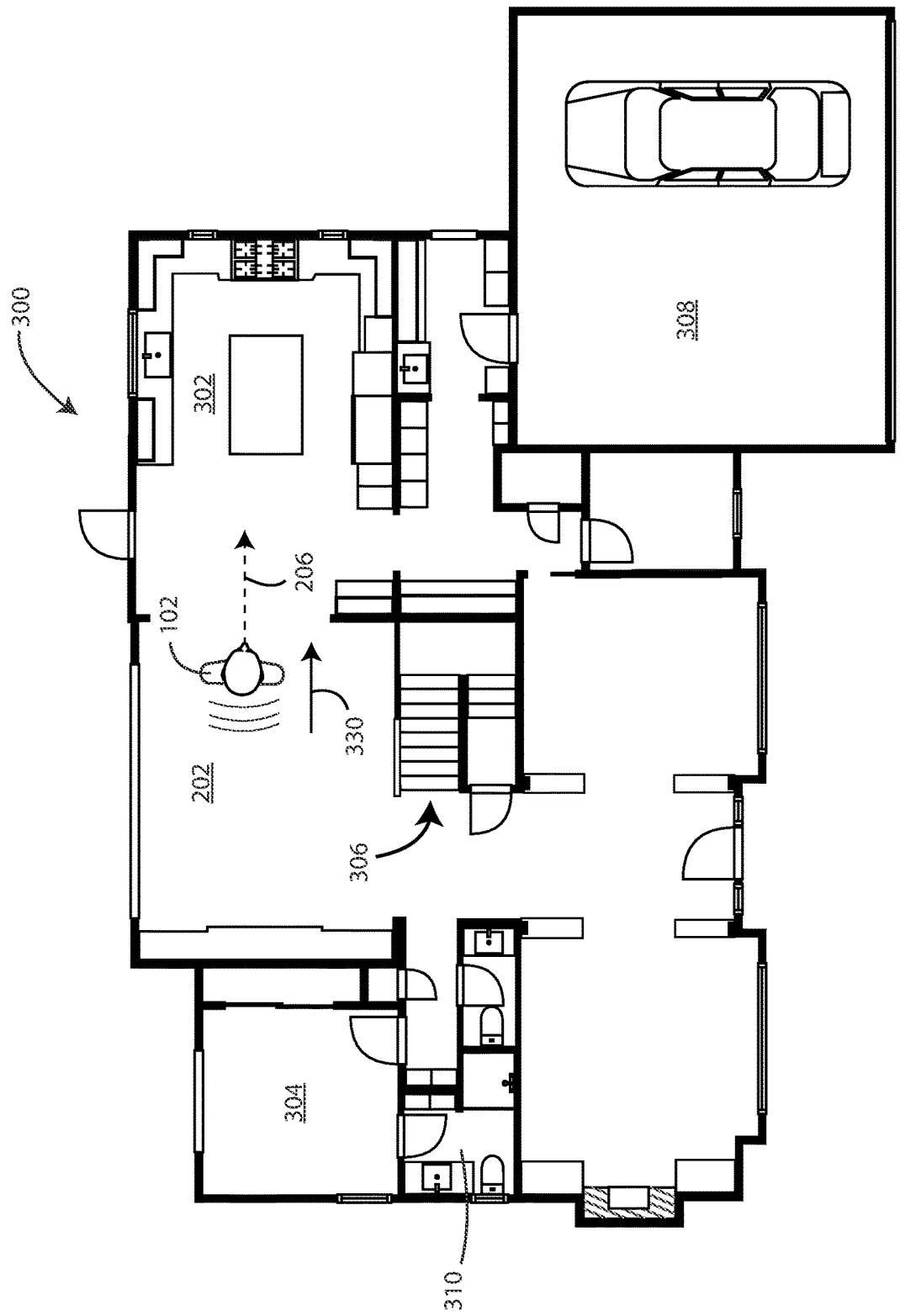
FIG. 3 is a plan view of a house in accordance with various embodiments herein.

Referring now to FIG. 3, a plan view of a house 300 is shown in accordance with various embodiments herein. In this example, the house 300 can include various rooms including a living room 202, a kitchen 302, a bedroom 304, stairs 306, a garage 308, a bathroom 310. FIG. 3 also shows a device wearer 102 within the house 300 along with a direction the device wearer 102 is facing 206 and a direction of movement 330. The direction of movement 330 indicates that the device wearer is moving into the kitchen 302.

In various embodiments, the ear-wearable device 104 can be configured to not select a controllable device 108 for control in a geospatial area if the detected movement indicates that the wearer can be leaving that geospatial area. In various embodiments, the ear-wearable device 104 can be configured to select a controllable device 108 for control in a geospatial area if the detected movement indicates that the wearer can be entering that geospatial area.

Figure 4:
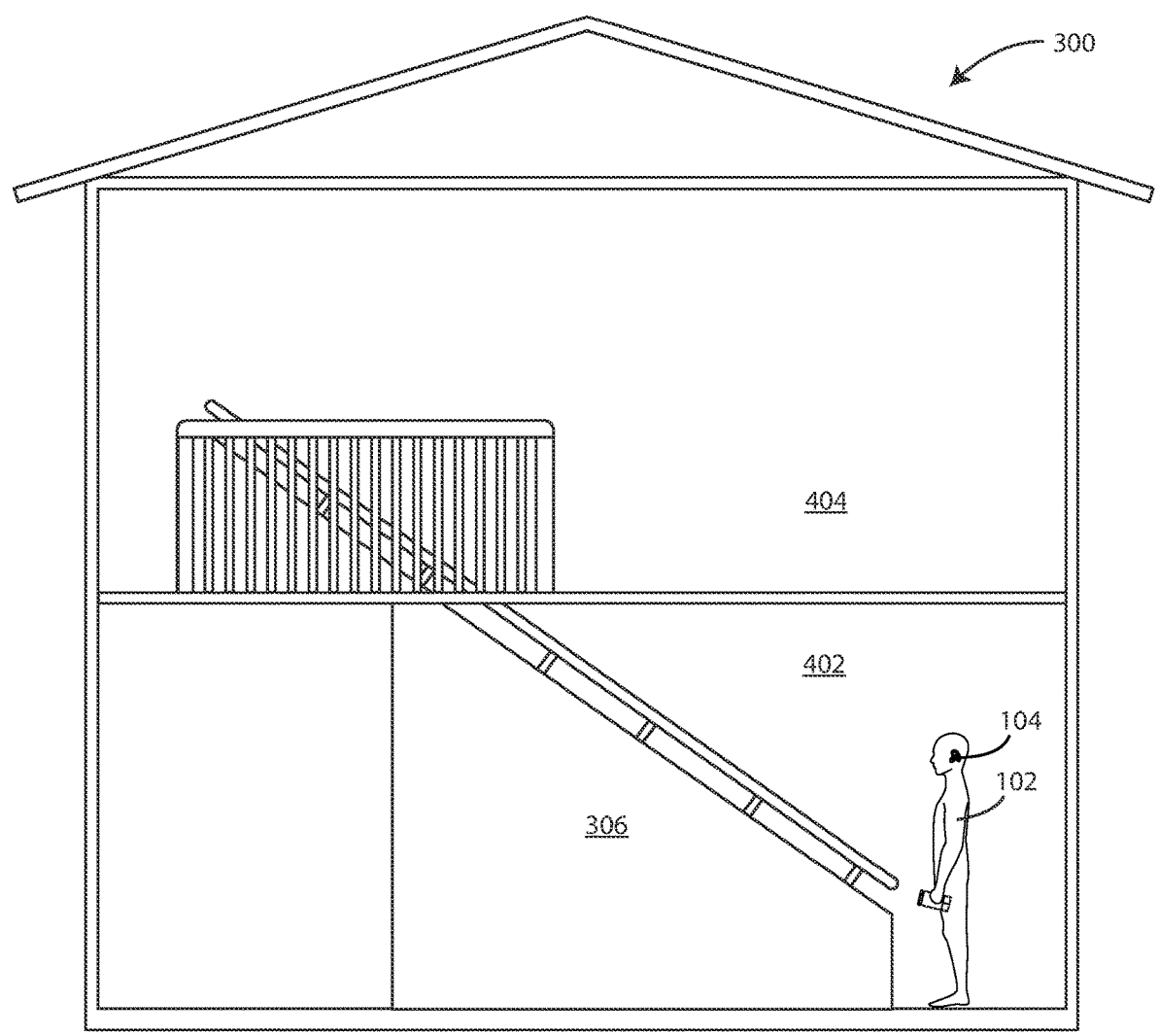
FIG. 4 is an elevation view of a house in accordance with various embodiments herein.

In various embodiments, the geospatial area can include an indication of the floor of a building that the device wearer is on. As such, the ear-wearable device 104 can also use the current floor that the device wearer is on as well as information regarding movement between one floor and another as a factor in selecting the correct controllable device. Referring now to FIG. 4, is an elevation view of a house 300 is shown in accordance with various embodiments herein. The house 300 includes stairs 306 that connect a first floor 402 and a second floor 404. The device wearer 102 with an ear-wearable device 104 is in the house 300 and is presently on the first floor 402. The presence of the device wearer 102 on the first floor 402 can be used as a factor in selecting the correct controllable device. Beyond the factors illustrated with respect to FIGS. 2-4, many other factors can also be used as an input for selecting a controllable device.

In various embodiments, the ear-wearable device 104 is further configured to classify the input from the wearer of the ear-wearable device 104 according to a type of command. In various embodiments, the ear-wearable device 104 is configured to limit a set of controllable devices to be controlled based on the classification. For example, classifications can include, but are not limited to, devices with a sound volume that can be controlled, devices with a temperature than can be controlled, devices with a timer, devices with an alarm, and the like.

In various embodiments, the ear-wearable device 104 is configured to detect a current time and include the current time as a factor for selection of a controllable device 108 to be controlled. In various embodiments, the ear-wearable device 104 is configured to record activity of the wearer and derive an activity pattern of the wearer based on the recorded activity.

In various embodiments, the ear-wearable device 104 is configured to include the derived activity pattern as a factor for selection of a controllable device 108 to be controlled. As one specific example, the activity pattern could be waking in the night and entering a bathroom. Determination of activity patterns is described in greater detail below.

Figure 5:
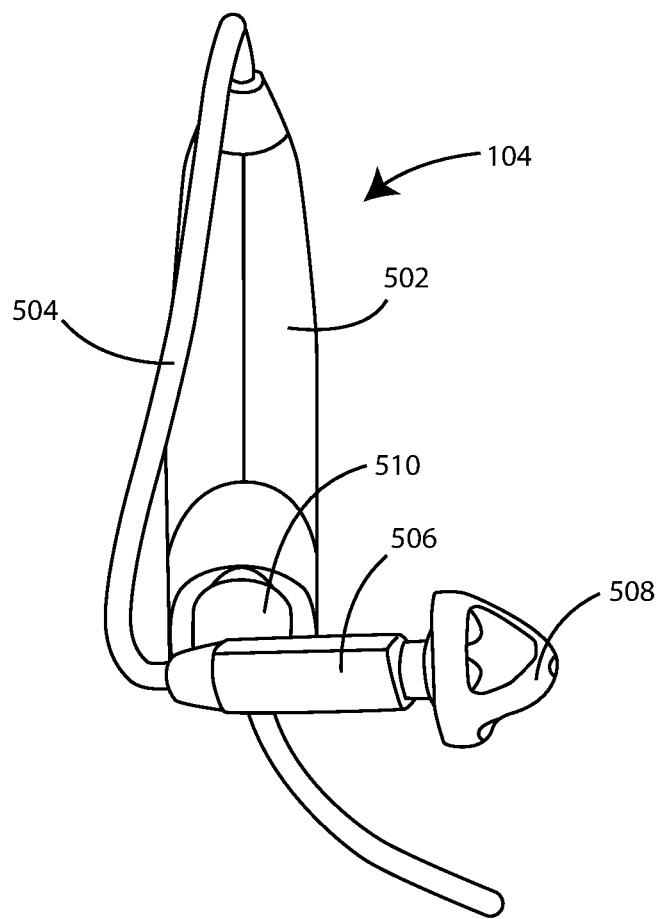
FIG. 5 is a schematic view of an ear-wearable device in accordance with various embodiments herein.

Referring now to FIG. 5, a schematic view of an ear-wearable device 104 is shown in accordance with various embodiments herein. The ear-wearable device 104 can include a hearing device housing 502. The hearing device housing 502 can define a battery compartment 510 into which a battery can be disposed to provide power to the device. The ear-wearable device 104 can also include a receiver 506 adjacent to an earbud 508. The receiver 506 an include a component that converts electrical impulses into sound, such as an electroacoustic transducer, speaker, or loudspeaker. Such components can be used to generate an audible stimulus in various embodiments herein. A cable 504 or connecting wire can include one or more electrical conductors and provide electrical communication between components inside of the hearing device housing 502 and components inside of the receiver 506.

The ear-wearable device 104 shown in FIG. 5 is a receiver-in-canal type device and thus the receiver is designed to be placed within the ear canal. However, it will be appreciated that many different form factors for ear-worn devices are contemplated herein. As such, ear-worn devices herein can include, but are not limited to, behind-the-ear (BTE), in-the ear (ITE), in-the-canal (ITC), invisible-in-canal (IIC), receiver-in-canal (MC), receiver in-the-ear (RITE) and completely-in-the-canal (CIC) type hearing assistance devices.

The term "ear-worn device" shall also refer to devices that can produce optimized or processed sound for persons with normal hearing. Ear-worn devices herein can include hearing assistance devices. In some embodiments, the ear-worn device can be a hearing aid falling under 21 C.F.R. § 801.420. In another example, the ear-worn device can include one or more Personal Sound Amplification Products (PSAPs). In another example, the ear-worn device can include one or more cochlear implants, cochlear implant magnets, cochlear implant transducers, and cochlear implant processors. In another example, the ear-worn device can include one or more "hearable" devices that provide various types of functionality. In other examples, ear-worn devices can include other types of devices that are wearable in, on, or in the vicinity of the user's ears. In other examples, ear-worn devices can include other types of devices that are implanted or otherwise osseointegrated with the user's skull; wherein the device is able to facilitate stimulation of the wearer's ears via the bone conduction pathway.

Ear-worn devices of the present disclosure can incorporate an antenna arrangement coupled to a radio, such as a 2.4 GHz radio. The radio can conform to an IEEE 802.11 (e.g., WIFI®) or BLUETOOTH® (e.g., BLE, BLUETOOTH® 4.2 or 5.0) specification, for example. It is understood that ear-worn devices of the present disclosure can employ other radios, such as a 900 MHz radio. Ear-worn device of the present disclosure can also include hardware, such as one or more antennas, for NFMI or NFC wireless communications. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files.

Figure 6:
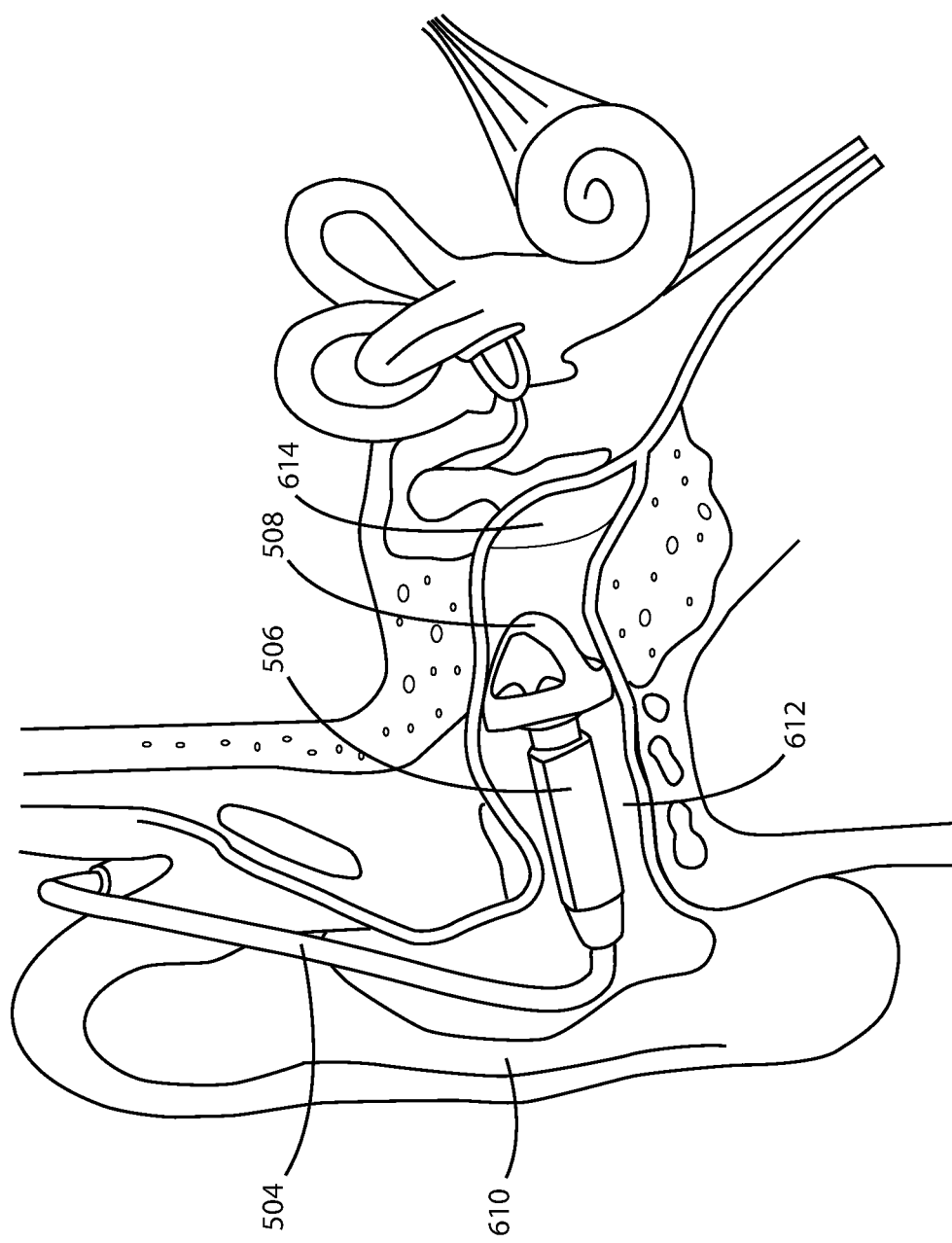
FIG. 6 is a schematic view of an ear-wearable device being worn in accordance with various embodiments herein.

As mentioned above, the ear-wearable device 104 shown in FIG. 5 can be a receiver-in-canal type device and thus the receiver is designed to be placed within the ear canal. Referring now to FIG. 6, a schematic view is shown of an ear-wearable device 104 disposed within the ear of a subject in accordance with various embodiments herein. In this view, the receiver 506 and the earbud 508 are both within the ear canal 612, but do not directly contact the tympanic membrane 614. The hearing device housing is mostly obscured in this view behind the pinna 610, but it can be seen that the cable 504 passes over the top of the pinna 610 and down to the entrance to the ear canal 612.

In some embodiments, an ear-wearable device herein can be part of a system that may also include other components/ devices. By way of example, in some embodiments, a system herein can also include an accessory device. The accessory device can communicate with the ear-wearable device(s) and exchange general data, sensor data, notifications, convey messages or commands, etc. In some embodiments, processing intensive tasks can be offloaded to the accessory device.

Figure 7:
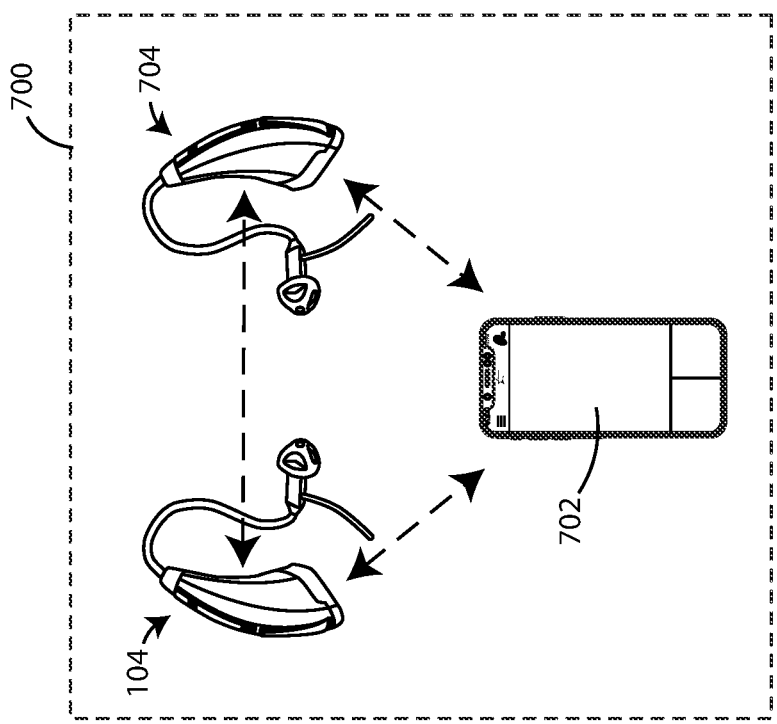
FIG. 7 is a schematic view of some components of an ear-wearable device system in accordance with various embodiments herein.

Referring now to FIG. 7, a schematic view of some components of an ear-wearable device system 700 is shown in accordance with various embodiments herein. FIG. 7 shows an ear-wearable device 104 and a second ear-wearable device 704. FIG. 7 also shows an accessory device 702.

In various embodiments, signals and/or data can be exchanged between the ear-wearable device 104 and the second ear-wearable device 704. The signals and/or data can relate to any of the factors referred to herein that can be used for selecting a controllable device.

As one example, the direction that the head of the wearer can be pointing can be determined based on the position of the ear-wearable device 104 and a second ear-wearable device 704 worn by the wearer. In some embodiments, a direction as calculated by the second ear-wearable device 704 can be transmitted to the ear-wearable device 104. Then the ear-wearable device 104 can compare the direction information that is received against what it calculates itself and if the directions are in agreement then the ear-wearable device 104 can be assured that the direction information is accurate. In some embodiments, the ear-wearable device 104 can use a direction for purposes of selecting that represents an average or other combined value of the directions from the two ear-wearable devices.

In some embodiments, signals from both ear-wearable devices can be used to determine a piece of information like distance from a controllable device. For example, in a scenario where accessory devices emit a signal (which could be an ultrasonic signal), the respective times of arrival in each ear-wearable device can be determined which can allow both direction and distance of a given controllable device to be calculated.

In various embodiments, the geolocation of the wearer can be determined based on a geolocation of the accessory device 702 that can be transmitted to the ear-wearable device(s). In some embodiments, the accessory device 702 may include a locating circuit (or geolocation circuit) which can be used to determine the geolocation of the accessory device 702 and this location can be transmitted on to the ear-wearable device(s).

In some embodiments, the accessory device 702 can be used to convey a control command on to a controllable device. For example, in some embodiments, the ear-wearable device 104 can transmit a control command to the accessory device 702 (such as via BLUETOOTH) and the accessory device 702 can then transmit the control command onto one or more controllable devices via WIFI or another wired or wireless protocol. It will be appreciated that various security measures can also be used with ear-wearable devices and/or systems herein including, but not limited to authentication, encryption, pairing protocols, and other known security techniques/measures.

As referenced previously herein, the direction that the head of the device wearer is facing can be used as a factor in selecting a particular controllable device or group of controllable devices to issue a control command to. As the ear-wearable device is worn by the device wearer, determining the direction that the head is facing can be performed by determining the orientation of the ear-wearable device.

Figure 8:
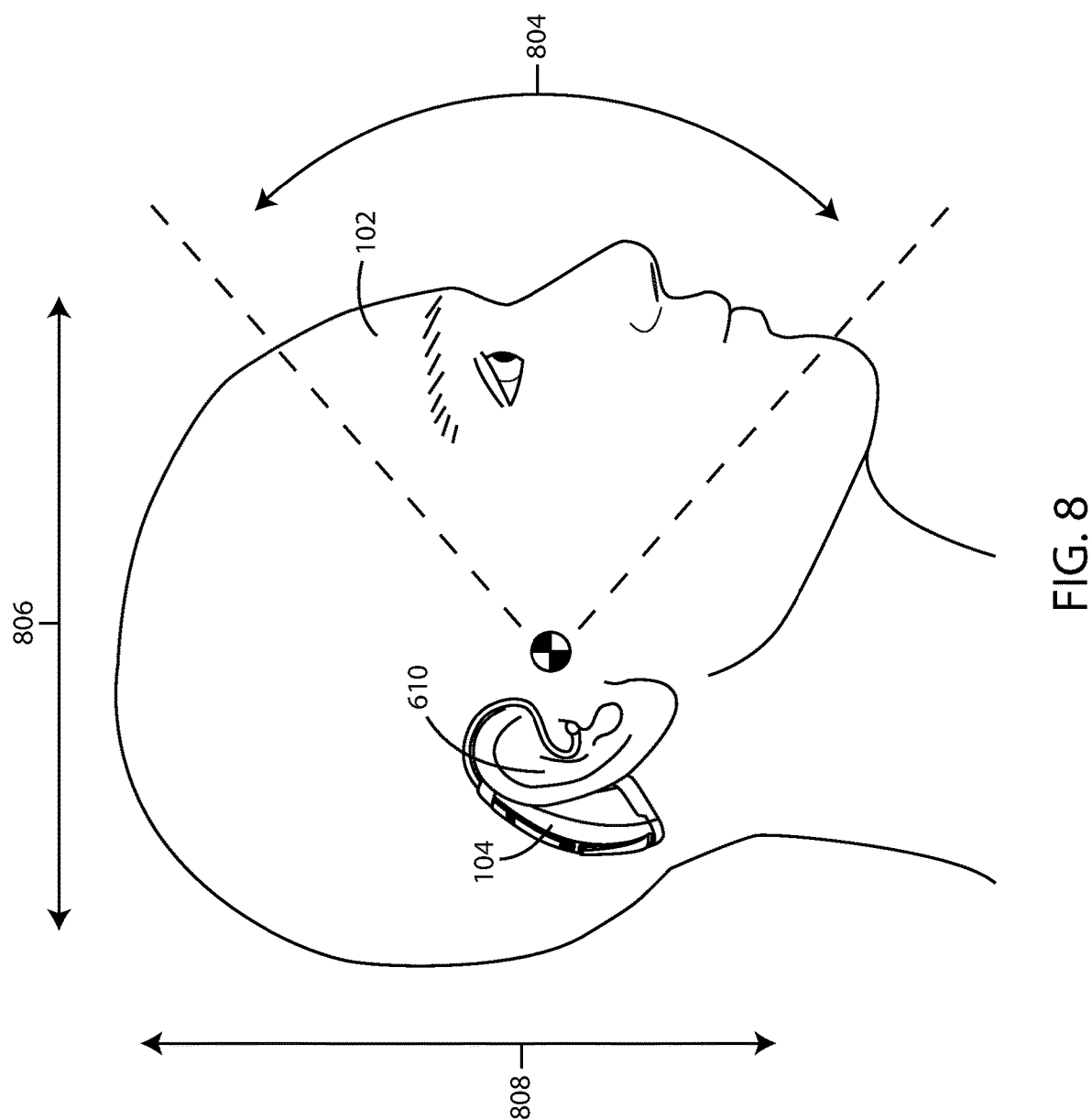
FIG. 8 is a schematic view of an ear-wearable device and a device wearer in accordance with various embodiments herein.
Figure 9:
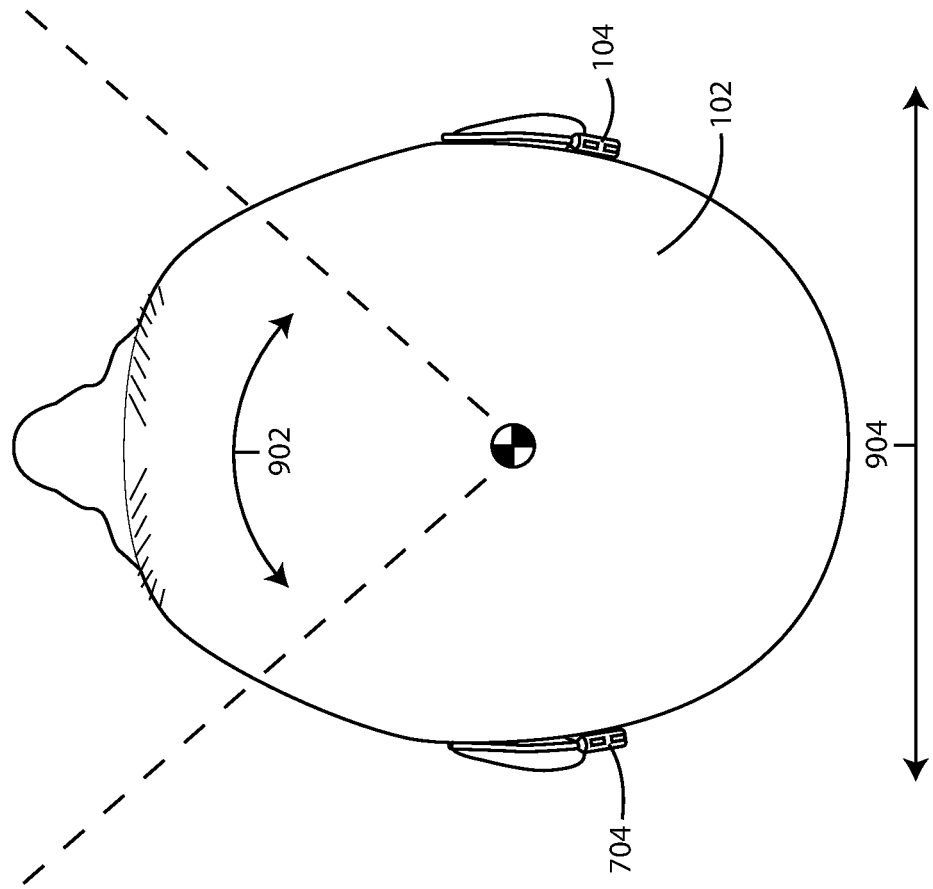
FIG. 9 is a schematic view of an ear-wearable device and a device wearer in accordance with various embodiments herein.

Referring now to FIG. 8, a schematic view is shown of an ear-wearable device 104 being worn on the ear 610 of a device wearer 102. As described herein, the ear-wearable device 104 can include a motion sensor. The motion sensor can allow various types of movement to be detected along with the orientation of the ear-wearable device 104 and therefore the direction that the device wearer 102 is facing. For example, the motion sensor can be used to detect front to back movement 806, up and down movement 808, and vertical rotation 804 of the head. Referring now to FIG. 9 (which is generally similar to FIG. 8, but is taken from a different perspective and shows a second ear-wearable device 704) the motion sensor can also be used to detect horizontal rotation 902 of the head as well as side to side movement 904. In fact, the motion sensor can effectively be used to detect movement and/or rotation in any direction.

Similarly, the motion sensor and/or other sensors of the ear-wearable device can be used to detect/receive non-verbal signals from the user in the form of head gestures, tapping on the head or ear-wearable device, or the like. The non-verbal signals can be used for input from the ear-wearable device wearer. In some embodiments, the non-verbal signals can also be used for purposes of confirmation of a command as described above.

Figure 10:
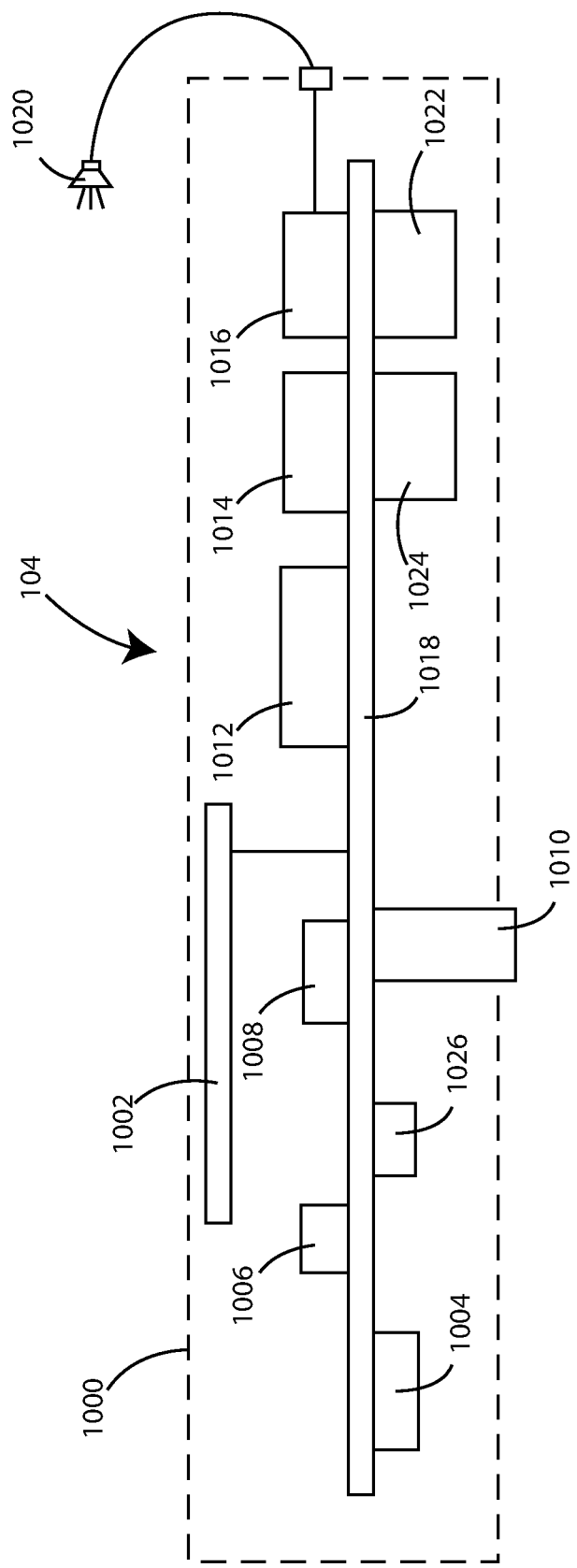
FIG. 10 is a schematic view of components of an ear-wearable device in accordance with various embodiments herein.

Referring now to FIG. 10, a schematic block diagram of components of an ear-worn device is shown in accordance with various embodiments herein. The block diagram of FIG. 10 represents a generic ear-worn device for purposes of illustration. The ear-wearable device 104 shown in FIG. 10 includes several components electrically connected to a flexible mother circuit 1018 (e.g., flexible mother board) which is disposed within housing 1000. A power supply circuit 1004 can include a battery and can be electrically connected to the flexible mother circuit 1018 and provides power to the various components of the ear-wearable device 104. One or more microphones 1006 are electrically connected to the flexible mother circuit 1018, which provides electrical communication between the microphones 1006 and a digital signal processor (DSP) 1012. Among other components, the DSP 1012 incorporates or is coupled to audio signal processing circuitry configured to implement various functions described herein. A sensor package 1014 can be coupled to the DSP 1012 via the flexible mother circuit 1018. The sensor package 1014 can include one or more different specific types of sensors such as those described in greater detail below. One or more user switches 1010 (e.g., on/off, volume, mic directional settings) are electrically coupled to the DSP 1012 via the flexible mother circuit 1018.

An audio output device 1016 is electrically connected to the DSP 1012 via the flexible mother circuit 1018. In some embodiments, the audio output device 1016 comprises an electroacoustic transducer or speaker (coupled to an amplifier). In other embodiments, the audio output device 1016 comprises an amplifier coupled to an external receiver 1020 adapted for positioning within an ear of a wearer. The external receiver 1020 can include an electroacoustic transducer, speaker, or loudspeaker. The ear-wearable device 104 may incorporate a communication device 1008 coupled to the flexible mother circuit 1018 and to an antenna 1002 directly or indirectly via the flexible mother circuit 1018. The communication device 1008 can be a BLUETOOTH® transceiver, such as a BLE (BLUETOOTH® low energy)

transceiver or other transceiver(s) (e.g., an IEEE 802.11 compliant device). The communication device 1008 can be configured to communicate with one or more external devices, such as those discussed previously, in accordance with various embodiments. In various embodiments, the communication device 1008 can be configured to communicate with an external visual display device such as a smart phone, a video display screen, a tablet, a computer, or the like.

In various embodiments, the ear-wearable device 104 can also include a control circuit 1022 and a memory storage device 1024. The control circuit 1022 can be in electrical communication with other components of the device. In some embodiments, a clock circuit 1026 can be in electrical communication with the control circuit. The control circuit 1022 can execute various operations, such as those described herein. The control circuit 1022 can include various components including, but not limited to, a microprocessor, a microcontroller, an FPGA (field-programmable gate array) processing device, an ASIC (application specific integrated circuit), or the like. The memory storage device 1024 can include both volatile and non-volatile memory. The memory storage device 1024 can include ROM, RAM, flash memory, EEPROM, SSD devices, NAND chips, and the like. The memory storage device 1024 can be used to store data from sensors as described herein and/or processed data generated using data from sensors as described herein.

It will be appreciated that various of the components described in FIG. 10 can be associated with separate devices and/or accessory devices to the ear-worn device. By way of example, microphones can be associated with separate devices and/or accessory devices. Similarly, audio output devices can be associated with separate devices and/or accessory devices to the ear-worn device.

Accessory devices herein can include various different components. In some embodiments, the accessory device can be a personal communications device, such as a smart phone. However, the accessory device can also be other things such as a wearable device, a handheld computing device, a dedicated location determining device (such as a handheld GPS unit), or the like.

Figure 11:
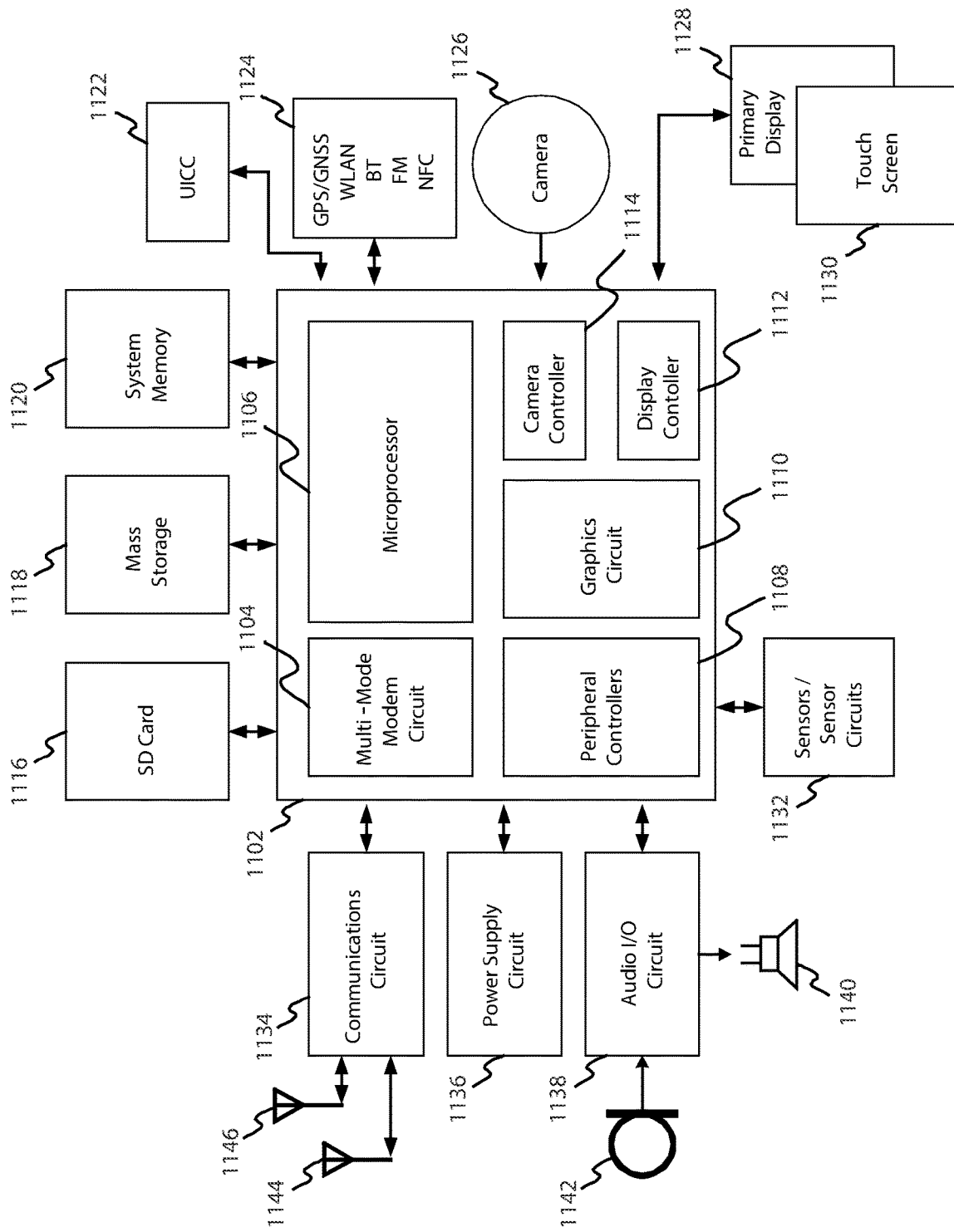
FIG. 11 is a block diagram of components of an accessory device in accordance with various embodiments herein.

Referring now to FIG. 11, a schematic block diagram is shown of components of an accessory device 702 (which could be a personal communications device or another type of accessory device) in accordance with various embodiments herein. This block diagram is just provided by way of illustration and it will be appreciated that accessory devices can include greater or lesser numbers of components. The accessory device in this example can include a control circuit 1102. The control circuit 1102 can include various components which may or may not be integrated. In various embodiments, the control circuit 1102 can include a microprocessor 1106, which could also be a microcontroller, FPGA, ASIC, or the like. The control circuit 1102 can also include a multi-mode modem circuit 1104 which can provide communications capability via various wired and wireless standards. The control circuit 1102 can include various peripheral controllers 1108. The control circuit 1102 can also include various sensors/sensor circuits 1132. The control circuit 1102 can also include a graphics circuit 1110, a camera controller 1114, and a display controller 1112. In various embodiments, the control circuit 1102 can interface with an SD card 1116, mass storage 1118, and system memory 1120. In various embodiments, the control circuit 1102 can interface with universal integrated circuit card (UICC) 1122. A spatial location determining circuit can be included and can take the form of an integrated circuit 1124 that can include components for receiving signals from GPS, GLONASS, BeiDou, Galileo, SBAS, WLAN, BT, FM, NFC type protocols, 5G picocells, or E911. In various embodiments, the accessory device can include a camera 1126. In various embodiments, the control circuit 1102 can interface with a primary display 1128 that can also include a touch screen 1130. In various embodiments, an audio I/O circuit 1138 can interface with the control circuit 1102 as well as a microphone 1142 and a speaker 1140. In various embodiments, a power supply circuit 1136 can interface with the control circuit 1102 and/or various other circuits herein in order to provide power to the system. In various embodiments, a communications circuit 1134 can be in communication with the control circuit 1102 as well as one or more antennas (1144, 1146).

Methods

Many different methods are contemplated herein, including, but not limited to, methods of making, methods of using, and the like. Aspects of system/device operation described elsewhere herein can be performed as operations of one or more methods in accordance with various embodiments herein.

Figure 12:
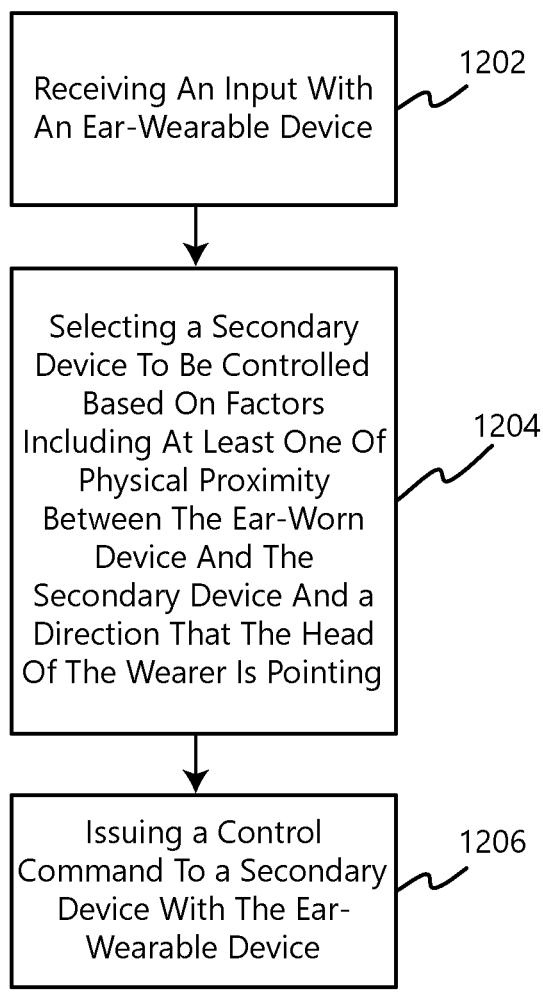
FIG. 12 is a flowchart of operations of a method in accordance with various embodiments herein.

In an embodiment, a method of controlling a controllable device is included. With reference to FIG. 12, the method can include receiving 1202 an input with an ear-wearable device, selecting 1204 the controllable device to be controlled based on factors including at least one of physical proximity between the ear-wearable device and the controllable device and a direction that the head of the wearer is pointing, and issuing 1206 a control command to the controllable device with the ear-wearable device.

In an embodiment, the method can further include determining the direction that the head of the wearer is pointing is based on the orientation of the ear-wearable device. In an embodiment, the method can further include determining the direction that the head of the wearer is pointing based on the ear-wearable device and a second ear-wearable device worn by the wearer.

In an embodiment, the method can further include sending a location request command to one or more controllable devices, the location request command configured to cause the controllable devices to emit a locating signal.

In an embodiment, the method can further include calculating a present geolocation of the ear-wearable device wearer. In an embodiment of the method, calculating a present geolocation of the ear-wearable device wearer further comprises utilizing at least one selected from the group consisting of angle of arrival, angle of departure, cell identity, time of arrival, time difference of arrival, and Rx power level.

In an embodiment, the method can further include detecting movement of the wearer and including detected movement as a factor for selection of a controllable device to be controlled. In an embodiment, the method can further include selecting a controllable device for control in a geospatial area if the detected movement indicates that the wearer is entering that geospatial area. In an embodiment, the method can further include not selecting a controllable device for control in a geospatial area if the detected movement indicates that the wearer is leaving that geospatial area.

In an embodiment, the method can further include detecting a current time and including the current time as a factor for selection of a controllable device to be controlled. For example, if the current time is detected to be 1 AM, the method can include weighting the selection of lights over another controllable device, such as a television. The current time can also be used by the method to automatically change certain features of a controllable device. For example, the volume of a television could be lowered or muted, or dimmable lights could be set to a low level. In such a scenario, the ear-wearable device can automatically send a control signal at a predetermined time. In some embodiments, the ear-wearable device and/or system can store information regarding "courtesy levels" for various devices. For example, a volume courtesy level for a television in the bedroom could be much lower than a courtesy level in a basement recreation room. In the case of a courtesy level, the ear-wearable device can issue a control command so that the courtesy level is not exceeded. For example, if a command is received to turn on the television, the command can include a control command to adjust the volume to less than or equal to the volume courtesy level.

In an embodiment, the method can further include recording activity of the wearer and deriving an activity pattern of the wearer based on the recorded activity. In an embodiment of the method, the activity pattern comprises waking in the night and entering a bathroom. In an embodiment of the method, the ear-wearable device is configured to include the derived activity pattern as a factor for selection of a controllable device to be controlled. This embodiment can also include automatically sending a control signal to the controllable devices, such as turning on a light when walking past it and turning it off once it is behind you. The system could also automatically turn on all the lights to the bathroom and then shut them after the user has walked past the second time, which would be the trip from the bathroom back to the bedroom.

In an embodiment, the method can further include providing an output to the wearer indicating the controllable device that is selected to be controlled. In an embodiment, the method can further include receiving a confirmation input from the wearer.

Own Voice Detection

Various embodiments herein include own voice detection features. Further details about own voice detection are provided as follows. However, it will be appreciated that this is merely provided by way of example and that further variations are contemplated herein.

It can be appreciated that while the ear-wearable device 104 should respond to inputs/commands from the device wearer 100, that it should typically ignore inputs/commands of a third party. As such, in various embodiments herein, the device or system can distinguish between speech or sounds associated with the device wearer 102 and speech or sounds associated with a third party. Processing to distinguish between the two can be executed by any devices of the system individually or by a combination of devices of the system. In some embodiments, data used for own voice detection can be exported from an ear-wearable device or devices to one or more separate devices for processing.

Distinguishing between speech or sounds associated with the device wearer 102 and speech or sounds associated with a third party can be performed in various ways. In some embodiments, this can be performed through signal analysis of the signals generated from one or more microphones. For example, in some embodiments, the system or a device thereof can filter out frequencies of sound that are not associated with speech of the device-wearer. In some embodiments, such as where there are two or more microphones (on the same ear-wearable device or on different ear-wearable devices) own voice detection can be done through spatial localization of the origin of the speech or other sounds and filtering out, spectrally subtracting, or otherwise discarding sounds that do not have an origin within the device wearer 102. In some embodiments, such as where there are two or more ear-worn devices, own-voice detection can be performed and/or enhanced through correlation or matching of intensity levels and or timing.

In some cases, the system can include a bone conduction microphone in order to preferentially pick up the voice of the device wearer. In some cases, the system can include a directional microphone that is configured to preferentially pick up the voice of the device wearer. In some cases, the system can include an intracanal microphone (e.g., a microphone configured to be disposed within the ear-canal of the device wearer) to preferentially pick up the voice of the device wearer. In some cases, the system can include a motion sensor (e.g., an accelerometer configured to be on or about the head of the wearer) to preferentially pick up skull vibrations associated with the vocal productions of the device wearer.

In some cases, an adaptive filtering approach can be used. By way of example, a desired signal for an adaptive filter can be taken from a first microphone and the input signal to the adaptive filter is taken from the second microphone. If the hearing aid wearer is talking, the adaptive filter models the relative transfer function between the microphones. Own-voice detection can be performed by comparing the power of an error signal produced by the adaptive filter to the power of the signal from the standard microphone and/or looking at the peak strength in the impulse response of the filter. The amplitude of the impulse response should be in a certain range in order to be valid for the own voice. If the user's own voice is present, the power of the error signal will be much less than the power of the signal from the standard microphone, and the impulse response has a strong peak with an amplitude above a threshold. In the presence of the user's own voice, the largest coefficient of the adaptive filter is expected to be within a particular range. Sound from other noise sources results in a smaller difference between the power of the error signal and the power of the signal from the standard microphone, and a small impulse response of the filter with no distinctive peak. Further aspects of this approach are described in U.S. Pat. No. 9,219,964, the content of which is herein incorporated by reference.

In another approach, the system or a device thereof uses a set of signals from a number of microphones. For example, a first microphone can produce a first output signal "A" from a filter and a second microphone can produce a second output signal "B" from a filter. The apparatus includes a first directional filter adapted to receive the first output signal "A" and produce a first directional output signal. A digital signal processor is adapted to receive signals representative of the sounds from the user's mouth from at least one or more of the first and second microphones and to detect at least an average fundamental frequency of voice (pitch output) "$F_0$". A voice detection circuit is adapted to receive the second output signal "B" and the pitch output "$F_0$" and to produce an own voice detection trigger "T". The apparatus further includes a mismatch filter adapted to receive and process the second output signal "B", the own voice detection trigger "T", and an error signal "E", where the error signal "E" is a difference between the first output signal "A" and an output "O" of the mismatch filter. A second directional filter is adapted to receive the matched output "O" and produce a second directional output signal. A first summing circuit is adapted to receive the first directional output signal and the second directional output signal and to provide a summed directional output signal "D". In use, at least the first microphone and the second microphone are in relatively constant spatial position with respect to the user's mouth, according to various embodiments. Further aspects of this approach are described in U.S. Pat. No. 9,210,518, the content of which is herein incorporated by reference.

Controllable Device Selection

In various embodiments herein, a particular controllable device or set of controllable devices is selected in order to send a command to, which can be based on various factors as described herein. It will be appreciated that selection of a particular controllable device can be performed by using many different algorithms.

In various embodiments, a machine-learning model can be used in order to make a selection based on the various factors and their respective weightings. By way of example, a training set of data can be used in a supervised learning approach in order to allow the model to infer a function that allows selection of an output value (a particular controllable device) based on specific inputs. In some embodiments, the training set of data can be updated (and therefore the model can be periodically improved) based on the confirmation, lack of confirmation, or rejection received from a device wearer. In this way, the accuracy of selection can increase over time. In some embodiments, a semi-supervised learning approach or even an unsupervised learning approach can be used.

In some embodiments, an ensemble learning algorithm can be used in order to select a particular controllable device. For example, discrete models can be made for each of the factors to be considered by the ear-wearable device as described herein. The ensemble learning algorithm can be used to combine the individual models into an ensemble model that can be used to predictions regarding the intended controllable device. Ensemble models can include random forest, AdaBoost (adaptive boosting), gradient boosting, and the like.

In some embodiments, a decision matrix algorithm can be used to consider the various factors and their respective weighting and select a particular controllable device.

In some embodiments, the task of selecting a particular controllable device can be setup as a classification problem. Classification algorithms that can be used can include a Naïve Bayes classifier, a decision tree, a support vector machine, K-nearest neighbors, and the like.

In some embodiments, certain rules can be used to simplify the decision-making process. For example, in various embodiments, the ear-wearable device is configured to not select a controllable device for control in a geospatial area if the detected movement indicates that the wearer is leaving that geospatial area. In various embodiments, the ear-wearable device is configured to select a controllable device for control in a geospatial area if the detected movement indicates that the wearer is entering that geospatial area.

In some embodiments, the ear-wearable device or another component or device of the system can maintain a table of controllable devices from which it must make a selection of a particular controllable device or group of controllable devices to issue a control command to. In some cases, the table can also include information such as what room the device is located in, the type of the device, the set of possible control commands the controllable device will accept, etc. In some embodiments, the table can be populated through a setup or configuration procedure to be executed with assistance from a person such as the device wearer or a third party. In some embodiments, the table can be populated and/or modified automatically based on detecting controllable devices and information about the same within a particular geospatial area (e.g., such as detecting an advertising packet of a device, or a handshake message of a particular device).

In some embodiments, the ear-wearable device or another component or device of the system can maintain a table of geospatial locations of significance, such that when geospatial information is generated or received the table of locations can be referenced to allow for a more accurate selection of a particular device. In some embodiments, the table of geospatial locations of significance can be created in a configuration step where the wearer can be directed to move to different locations and then the geospatial data associated with those locations can be recorded (e.g., "now move to your kitchen and say 'I am in the kitchen' when you have arrived"). In some embodiments, the table of geospatial locations can be loaded onto the ear-wearable device or accessory device as received from another device.

Control Commands

In various embodiments herein, after selection of the appropriate controllable device, the ear-wearable device or devices can be configured to issue a control command to the selected controllable device.

The control command can take many different forms. In some embodiments, the control command can be delivered over a wired network. In some embodiments, the control command can be delivered over a wireless network. For example, the control command can be a wireless message delivered over a WIFI network, over another wireless communication network, over a BLUETOOTH connection, an RF transmission, an optical transmission (such as infrared), a wireless mesh network, or the like.

The control command can be formed/formatted to comply with various protocols. In some embodiments, the control command can be a Z-Wave protocol message, a Zigbee protocol message, a Thread protocol message, an Insteon protocol message, an X10 protocol message, a UPB protocol message, or the like.

In some embodiments, a control command herein can include an identifier of the selected controllable device. The identifier can take the form of an IP address assigned to the selected controllable device, a hardware address (such as a MAC address), an assigned identifier, a device serial number, or the like. The control command can also include information on the desired action to be taken, such as actions relating to a power state, a volume, a temperature, a channel, a time, a device function, and the like.

Activity Patterns

In various embodiments herein, the ear-wearable device can use information regarding the activity patterns of the device wearer as a factor in selecting the correct controllable device for which a control command should be directed. Activity patterns can include patterns of movement, patterns of sleep, patterns of location, and the like. Activity patterns can be determined in various ways.

As merely one example, one or more sensors (such as a motion sensor) can be operatively connected to a controller (such as the control circuit described in FIG. 10) or another processing resource (such as a processor of another device or a processing resource in the cloud). The controller or other processing resource can be adapted to receive data representative of a characteristic of the subject from one or more of the sensors described herein and/or determine statistics of the subject over a monitoring time period based upon the data received from the sensor. As used herein, the term "data" can include a single datum or a plurality of data values or statistics. The term "statistics" can include any appropriate mathematical calculation or metric relative to data interpretation, e.g., probability, confidence interval, distribution, range, or the like. Further, as used herein, the term "monitoring time period" means a period of time over which characteristics of the subject are measured and statistics are determined. The monitoring time period can be any suitable length of time, e.g., 1 second, 10 seconds, 30 seconds, 1 minute, 10 minutes, 30 minutes, 1 hour, 1 day, 1 week, 1 month, etc., or a range of time between any of the foregoing time periods.

Any suitable technique or techniques can be utilized to determine statistics for the various data from the sensors, e.g., direct statistical analyses of time series data from the sensors, differential statistics, comparisons to baseline or statistical models of similar data, etc. Such techniques can be general or individual-specific and represent long-term or short-term behavior. These techniques could include standard pattern classification methods such as Gaussian mixture models, clustering as well as Bayesian approaches, neural network models and deep learning.

Further, in some embodiments, the controller can be adapted to compare data, data features, and/or statistics against various other patterns, which could be prerecorded patterns (baseline patterns) of the particular individual wearing an ear-wearable device herein, prerecorded patterns (group baseline patterns) of a group of individuals wearing ear-wearable devices herein, or the like.

Similarity and dissimilarity can be measured directly via standard statistical metrics such normalized Z-score, or similar multidimensional distance measures (e.g. Mahalanobis or Bhattacharyya distance metrics), or through similarities of modeled data and machine learning. These techniques can include standard pattern classification methods such as Gaussian mixture models, clustering as well as Bayesian approaches, neural network models, and deep learning.

As used herein the term "substantially similar" means that, upon comparison, the sensor data are congruent or have statistics fitting the same statistical model, each with an acceptable degree of confidence. The threshold for the acceptability of a confidence statistic may vary depending upon the subject, sensor, sensor arrangement, type of data, context, condition, etc.

The statistics associated with the activity pattern of an individual device wearer, over the monitoring time period, can be determined by utilizing any suitable technique or techniques, e.g., standard pattern classification methods such as Gaussian mixture models, clustering, hidden Markov models, as well as Bayesian approaches, neural network models, and deep learning.

Sensors

Ear-wearable devices herein can include one or more sensor packages (including one or more discrete or integrated sensors) to provide data. The sensor package can comprise one or a multiplicity of sensors. In some embodiments, the sensor packages can include one or more motion sensors (or movement sensors) amongst other types of sensors. Motion sensors herein can include inertial measurement units (IMU), accelerometers, gyroscopes, barometers, altimeters, and the like. The IMU can be of a type disclosed in commonly owned U.S. Pat. No. 9,848,273, which is incorporated herein by reference. In some embodiments, electromagnetic communication radios or electromagnetic field sensors (e.g., telecoil, NFMI, TMR, GMR, etc.) sensors may be used to detect motion or changes in position. In various embodiments, the sensor package can include a magnetometer. In some embodiments, biometric sensors may be used to detect body motions or physical activity. Motions sensors can be used to track movement of a patient in accordance with various embodiments herein.

In some embodiments, the motion sensors can be disposed in a fixed position with respect to the head of a patient, such as worn on or near the head or ears. In some embodiments, the operatively connected motion sensors can be worn on or near another part of the body such as on a wrist, arm, or leg of the patient.

According to various embodiments, the sensor package can include one or more of an IMU, and accelerometer (3, 6, or 9 axis), a gyroscope, a barometer, an altimeter, a magnetometer, a magnetic sensor, an eye movement sensor, a pressure sensor, an acoustic sensor, a telecoil, a heart rate sensor, a global positioning system (GPS), a temperature sensor, a blood pressure sensor, an oxygen saturation sensor, an optical sensor, a blood glucose sensor (optical or otherwise), a galvanic skin response sensor, a cortisol level sensor (optical or otherwise), a microphone, acoustic sensor, an electrocardiogram (ECG) sensor, electroencephalography (EEG) sensor which can be a neurological sensor, eye movement sensor (e.g., electrooculogram (EOG) sensor), myographic potential electrode sensor (EMG), a heart rate monitor, a pulse oximeter or oxygen saturation sensor (SpO2), a wireless radio antenna, blood perfusion sensor, hydrometer, sweat sensor, cerumen sensor, air quality sensor, pupillometry sensor, cortisol level sensor, hematocrit sensor, light sensor, image sensor, and the like.

In some embodiments, the sensor package can be part of an ear-wearable device. However, in some embodiments, the sensor packages can include one or more additional sensors that are external to an ear-wearable device. For example, various of the sensors described above can be part of a wrist-worn or ankle-worn sensor package, or a sensor package supported by a chest strap. In some embodiments, sensors herein can be disposable sensors that are adhered to the device wearer ("adhesive sensors") and that provide data to the ear-wearable device or another component of the system.

Data produced by the sensor(s) of the sensor package can be operated on by a processor of the device or system.

As used herein the term "inertial measurement unit" or "IMU" shall refer to an electronic device that can generate signals related to a body's specific force and/or angular rate. IMUs herein can include one or more accelerometers (3, 6, or 9 axis) to detect linear acceleration and a gyroscope to detect rotational rate. In some embodiments, an IMU can also include a magnetometer to detect a magnetic field.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The oxygen saturation sensor (such as a blood oximetry sensor) can be, for example, an optical sensor, an infrared sensor, a visible light sensor, or the like.

The electrical signal sensor can include two or more electrodes and can include circuitry to sense and record electrical signals including sensed electrical potentials and the magnitude thereof (according to Ohm's law where V=IR) as well as measure impedance from an applied electrical potential.

It will be appreciated that the sensor package can include one or more sensors that are external to the ear-wearable device. In addition to the external sensors discussed hereinabove, the sensor package can comprise a network of body sensors (such as those listed above) that sense movement of a multiplicity of body parts (e.g., arms, legs, torso).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An ear-wearable device comprising:
   a control circuit;
   a wireless communications circuit, wherein the wireless communications circuit is in electronic communication with the control circuit;
   a microphone, wherein the microphone is in electronic communication with the control circuit; and
   a motion sensor, wherein the motion sensor is in electronic communication with the control circuit;
   wherein the ear-wearable device is configured to
   receive an input from a wearer of the ear-wearable device;
   select a controllable device from a plurality of controllable devices that are not held or worn by the user to be controlled based on factors including at least one of physical proximity between the ear-wearable device and the controllable device and a direction that the head of the wearer is pointing; and
   issue a control command to the controllable device.

2. The ear-wearable device of claim 1, further comprising an electroacoustic transducer, wherein the electroacoustic transducer is in electrical communication with the control circuit.

3. The ear-wearable device of claim 1, wherein the direction that the head of the wearer is pointing is determined based on the orientation of the ear-wearable device.

4. The ear-wearable device of claim 1, wherein the direction that the head of the wearer is pointing is determined based on the position of the ear-wearable device and a second ear-wearable device worn by the wearer.

5. The ear-wearable device of claim 1, wherein the ear-wearable device is configured to send a location request command to one or more controllable devices, the location request command configured to cause the controllable devices to emit a locating signal.

6. The ear-wearable device of claim 1, wherein the ear-wearable device is configured to detect movement of the wearer of the ear-wearable device and include the detected movement as a factor for selection of a controllable device to be controlled.

7. The ear-wearable device of claim 6, wherein the ear-wearable device is configured to not select a controllable device for control in a geospatial area if the detected movement indicates that the wearer is leaving that geospatial area.

8. The ear-wearable device of claim 6, wherein the ear-wearable device is configured to select a controllable device for control in a geospatial area if the detected movement indicates that the wearer is entering that geospatial area.

9. The ear-wearable device of claim 1, wherein the ear-wearable device is configured to detect a current time and include the current time as a factor for selection of a controllable device to be controlled.

10. The ear-wearable device of claim 1, wherein the ear-wearable device is configured to record activity of the wearer and derive an activity pattern of the wearer based on the recorded activity.

11. The ear-wearable device of claim 10, wherein the ear-wearable device is configured to include the derived activity pattern as a factor for selection of a controllable device to be controlled.

12. The ear-wearable device of claim 10, wherein the activity pattern comprises waking in the night and entering a bathroom.

13. The ear-wearable device of claim 1, further comprising a magnetometer.

14. The ear-wearable device of claim 13, wherein the ear-wearable device is configured to determine an orientation of the ear-wearable device utilizing at least one of the motion sensor and the magnetometer.

15. A method of controlling a controllable device comprising:
   receiving an input with an ear-wearable device;
   selecting the controllable device from a plurality of controllable devices that are not held or worn by the user to be controlled based on factors including at least one of physical proximity between the ear-wearable device and the controllable device and a direction that the head of the wearer is pointing; and issuing a control command to the controllable device with the ear-wearable device.

16. The method of claim 15, further comprising determining the direction that the head of the wearer is pointing is based on the orientation of the ear-wearable device.

17. The method of claim 15, further comprising determining the direction that the head of the wearer is pointing based on the ear-wearable device and a second ear-wearable device worn by the wearer.

18. A method of controlling a controllable device comprising:
   receiving an input with an ear-wearable device;
   selecting the controllable device from a plurality of controllable devices that are not held or worn by the user to be controlled based on factors including a physical proximity between the ear-wearable device and the controllable device; and
   issuing a control command to the controllable device with the ear-wearable device.

19. The method of claim 18, further comprising narrowing a set of possible controllable devices down to a subset based on physical proximity between the ear-wearable device and the set of possible controllable devices.

20. The method of claim 19, further comprising selecting at least one controllable device from the subset to issue a control command to based on the received input.

\* \* \* \* \*